(12) United States Patent
Hong et al.

(10) Patent No.: US 9,975,995 B2
(45) Date of Patent: May 22, 2018

(54) ION CONDUCTING POLYMER COMPRISING PARTIALLY BRANCHED BLOCK COPOLYMER AND USE THEREOF

(71) Applicant: KOREA RESEARCH INSTITUTE OF CHEMICAL TECHNOLOGY, Daejeon (KR)

(72) Inventors: Young Taik Hong, Daejeon (KR); Jang Yong Lee, Daejeon (KR); Tae Ho Kim, Daejeon (KR); Duk Man Yu, Ansan-si (KR); Seog Je Kim, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 442 days.

(21) Appl. No.: 14/709,264

(22) Filed: May 11, 2015

(65) Prior Publication Data

US 2015/0307659 A1 Oct. 29, 2015

Related U.S. Application Data

(63) Continuation-in-part of application No. PCT/KR2013/010209, filed on Nov. 11, 2013.

(30) Foreign Application Priority Data

Nov. 9, 2012 (KR) .................. 10-2012-0126980

(51) Int. Cl.
*C08F 283/00* (2006.01)
*E01C 7/26* (2006.01)
(Continued)

(52) U.S. Cl.
CPC ............. *C08G 65/48* (2013.01); *C08G 61/10* (2013.01); *C08G 61/12* (2013.01);
(Continued)

(58) Field of Classification Search
CPC .. C08G 65/48; H01M 8/1032; H01M 8/0221; H01M 8/188; H01M 8/20; H01M 2008/1095; H01M 2300/0082
(Continued)

(56) References Cited

U.S. PATENT DOCUMENTS

| 4,625,000 A | 11/1986 | Chao et al. |
| 2011/0262838 A1* | 10/2011 | Maier .................... B01D 71/52 429/493 |

FOREIGN PATENT DOCUMENTS

| EP | 1 113 517 A2 | 7/2001 |
| JP | 2003-147074 A | 5/2003 |

(Continued)

*Primary Examiner* — William Cheung
(74) *Attorney, Agent, or Firm* — Seed IP Law Group LLP

(57) ABSTRACT

The present invention relates to an ion conducting polymer including a partially branched block copolymer; a method of preparing the same; an ion conductor including the ion conducting polymer; an electrolytic membrane including the ion conducting polymer; a membrane-electrode assembly comprising the electrolytic membrane, and a battery comprising the same; and a separation membrane for a redox flow battery including the ion conducting polymer, and a redox flow battery comprising same. Specifically, the partially branched block copolymer includes: a first block including a hydrophilic first polymer; a second block derived from a hydrophobic second polymer having two or more reactive groups respectively on its both ends, in such a way as to form branching points forming side branches on a main chain; and optionally a third block including a hydrophobic third polymer. The ion conducting polymer in the form of a partially branched block copolymer can prepare a polymer membrane having improved conductivity and superior physical properties such as tensile strength elongation at break, etc., while having the same or similar ion-exchange capacity (IEC), percentage water absorption (Continued)

and/or degree of dimensional change compared to conventional ion conducting polymers in the form of linear block copolymers. Because of such outstanding physical properties, the polymer membrane can be used as a membrane-electrode assembly for a fuel cell, and a redox flow battery comprising the same as a separation membrane can exhibit outstanding cell performance and maintain high discharge charge capacity retention rate even when repeatedly charged and discharged several times.

20 Claims, 13 Drawing Sheets

(51) Int. Cl.
| | | |
|---|---|---|
| C08G 65/48 | (2006.01) | |
| H01M 8/1023 | (2016.01) | |
| H01M 8/18 | (2006.01) | |
| C08G 61/10 | (2006.01) | |
| C08G 61/12 | (2006.01) | |
| H01M 8/0221 | (2016.01) | |
| H01M 8/20 | (2006.01) | |
| C08G 65/40 | (2006.01) | |
| H01M 8/1032 | (2016.01) | |
| H01M 8/1018 | (2016.01) | |

(52) U.S. Cl.
CPC ...... *C08G 65/4012* (2013.01); *H01M 8/0221* (2013.01); *H01M 8/1023* (2013.01); *H01M 8/188* (2013.01); *H01M 8/20* (2013.01); *C08G 2261/126* (2013.01); *C08G 2261/142* (2013.01); *C08G 2261/148* (2013.01); *C08G 2261/1452* (2013.01); *C08G 2261/312* (2013.01); *C08G 2261/3444* (2013.01); *C08G 2261/412* (2013.01); *C08G 2261/516* (2013.01); *H01M 8/1032* (2013.01); *H01M 2008/1095* (2013.01); *H01M 2300/0082* (2013.01); *Y02E 60/528* (2013.01); *Y02P 70/56* (2015.11)

(58) Field of Classification Search
USPC .............................. 525/535; 524/68; 429/903
See application file for complete search history.

(56) References Cited

FOREIGN PATENT DOCUMENTS

| JP | 2006-312742 A | 11/2006 |
|---|---|---|
| JP | 2010-189503 A | 9/2010 |
| KR | 10-2005-0016399 A | 2/2005 |
| KR | 10-2006-0130099 A | 12/2006 |
| KR | 10-2009-0055737 A | 6/2009 |
| KR | 10-2010-0065349 A | 6/2010 |
| KR | 1020130011676 A | 1/2013 |
| KR | 1020140060440 A | 5/2014 |
| KR | 10-2013-0105535 A | 3/2015 |
| WO | WO 2014/073934 A1 | 5/2014 |

* cited by examiner

ION CONDUCTING POLYMER COMPRISING PARTIALLY BRANCHED BLOCK COPOLYMER AND USE THEREOF

This is a US National Stage of International Application PCT/KR2013/010209, filed Nov. 11, 2013, which claims the benefit of priority to Republic of Korea Patent Application No. KR 10-2012-0126980, filed Nov. 9, 2012, the disclosures of all of which are hereby incorporated by reference in their entireties.

TECHNICAL FIELD

The present invention relates to an ion conducting polymer comprising a partially branched block copolymer; a method of preparing the same; an ion conductor comprising the ion conducting polymer; an electrolytic membrane comprising the ion conducting polymer; a membrane-electrode assembly comprising the electrolytic membrane, and a battery comprising the same; and a separation membrane for a redox flow battery comprising the ion conducting polymer, and a redox flow battery comprising same. Specifically, the partially branched block copolymer comprises: a first block consisting of a hydrophilic first polymer; a second block derived from a hydrophobic second polymer having two or more reactive groups respectively on its both ends, in such a way as to form branching points forming side branches on its main chain; and optionally a third block consisting of a hydrophobic third polymer.

BACKGROUND ART

A fuel cell is an energy converting device which directly converts chemical energy of fuels directly into electrical energy, and due to its eco-friendly characteristics of high energy efficiency and low release of pollutants it has been developed as a next generation energy source. A proton exchange membrane fuel cell also known as polymer electrolyte membrane fuel cell (PEMFC), which contains polymer electrolyte membrane polymer, has been highlighted as a power device for portable use as well as uses in vehicles and at homes for advantages such as low operating temperatures, elimination of leakage problems caused by the use of a solid electrolyte, and fast operations.

A polymer electrolyte fuel cell, being a type of a direct current power generation device converting chemical energy of fuels directly into electrical energy by an electrochemical reaction, is a continuous complex consisting of a membrane-electrode assembly (MEA), which serves as the heart of a fuel cell, and a bipolar plate, which collects electricity generated and supplies fuels. In particular, the membrane-electrode assembly refers to an assembly of an electrode, in which an electrochemical catalytic reaction occurs between a fuel (an aqueous methanol solution or hydrogen) and air, and a polymer membrane in which, a hydrogen ion transfer occurs.

Meanwhile, all electrochemical reactions are divided into two separate reactions, that is, an oxidation, which occurs at the anode and a reduction, which occurs at the cathode. The anode and cathode are separated by an electrolyte. In a direct methanol fuel cell among fuel cells, methanol and water are supplied to the anode instead of hydrogen, and the hydrogen ions generated from the oxidation reaction of methanol move to the cathode along with the polymer electrolyte and generate electricity by a reduction reaction with oxygen supplied to the cathode. The details of the reactions are as follows:

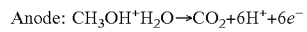
Anode: $CH_3OH + H_2O \rightarrow CO_2 + 6H^+ + 6e^-$

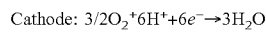
Cathode: $3/2 O_2 + 6H^+ + 6e^- \rightarrow 3H_2O$

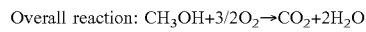
Overall reaction: $CH_3OH + 3/2 O_2 \rightarrow CO_2 + 2H_2O$

An ion exchange membrane used as a solid electrolyte in a fuel cell is present between the two electrodes and transports hydrogen ions produced in the oxidizing electrode (anode) to the reducing electrode (cathode).

Generally, the electrolyte membrane used in a polymer electrolyte fuel cell can be classified into perfluorinated and hydrocarbon polymer electrolytes. The perfluorinated polymer electrolyte has been commercially available as a polymer membrane of polymer electrolytic fuel cells, because it is chemically stable due to a strong carbon-fluorine (C—F) bonding force and shielding effects, a characteristic of a fluorine atom, has an excellent mechanical property, and especially an excellent conductivity as a hydrogen ion exchange membrane. Nafion (a perfluorinated sulfonic acid polymer), a product of a U.S. company, Du Pont, is a typical example of commercialized hydrogen ion exchange membrane, and is most commonly used because of excellence in ionic conductivity, chemical stability, ionic selectivity, etc. However, the perfluorinated polymer electrolyte membrane, with such superior performances has disadvantages of a low industrial utilization due to a high price, high methanol crossover, the permeability of methanol to pass through the polymer membrane, reduced polymer membrane efficiency at 80° C. or higher. Thus, studies have been focused on the development of a competitive hydrocarbon ion exchange membrane.

Polymer electrolyte membranes used in fuel cells must be stable at conditions required during a fuel cell operation. Thus, the polymers to be used are very limited to those such as an aromatic polyether (APE), etc. Hydrolysis, oxidation, and reduction reactions, etc., during a fuel cell operation reduce fuel cell performance by decomposing a polymer membrane. Thus, polyetherketone-based or polyethersulfone-based polyaryleneether polymers have been studied for their application in fuel cells, because of their excellent chemical stability and mechanical properties.

As a method for producing a polymer with improved ion conductivity, a polymer introduced with a hydrophilic functional group has been used. U.S. Pat. No. 4,625,000 discloses a post-sulfonation process of polyethersulfone as a polymer electrolyte membrane. The post-sulfonation method disclosed in the patent has a drawback that it is difficult to control distribution, location and number of sulfonic acid groups (—$SO_3H$), because it uses a strong acid such as sulfuric acids as a sulfonating agent and sulfonic acid groups are randomly introduced into the polymer backbone.

Further, European Patent No. 1,113,517 A2 discloses a block copolymer electrolyte membrane consisting of blocks with or without sulfonic acid groups. Because a block copolymer consisting of an aliphatic block and an aromatic block is post-sulfonated using sulfuric acid, a strong acid, there are problems such as decomposition of chemical bonds between aliphatic polymers, etc., and also difficulties in controlling location and number of sulfonic acid groups in the polymer backbone due to random introduction of sulfonic acid groups into the ring constituting an aromatic block.

Meanwhile, Japanese Patent Application Publication No. 2003-147074 discloses a method of introducing a sulfonic acid group into a copolymer containing fluorine compound using chlorosulfonic acid ($HSO_3Cl$) or sulfuric acid. In the method, Sulfonic acid groups are randomly introduced onto a ring constituting a fluorene compound.

Polymer sulfonation methods proposed in the related arts were unable to satisfy the physical properties for electrolyte membranes required during a fuel cell operation because they excessively increase water and methanol contents of electrolyte membranes and thus dissolve electrolyte membranes in methanol, etc., when the degree of sulfonation (DS) is increased in order to achieve a hydrogen ion conductivity similar to that of a commercially available Nafion (Dupont), thus significantly reducing the degree of mechanical integration of electrolyte membranes.

Meanwhile, in order to solve the problems of fossil fuel exhaustion and environmental contamination, efforts such as reducing consumption of fossil fuels by improving their use efficiency or extending the applications of renewable energies into an increased number of fields have been made. Although renewable energy sources, such as solar and wind power, are more efficiently used than ever before, these energy sources are not still prevalent and unpredictable. Due to such characteristics, there is a limited dependence on these energy sources, and the proportion of the renewable energy sources in the primary power source is very low.

A rechargeable battery provides a simple and efficient way to store electricity, so efforts have been continuously made to increase its mobility by minimizing its size, thus utilizing it as an infrequent auxiliary power supply or as a power supply for laptops, tablet PCs, mobile phones and other small electric appliances.

A redox flow battery (RFB) is a secondary battery which stores energy for a long period by repeated charging and discharging respectively via electrochemical reversible reactions of electrolytes. Because stacks and electrolyte tanks which respectively control the capacity and output characteristics of the battery are conFIG.d to be independent from each other, the designing of the battery can be performed without limitation, and also there is little limitation regarding space for its installation.

The redox flow battery exhibits a load leveling function, compensates or inhibits functions for power failure or instantaneous low-voltage, etc., which enables accommodating a rapid increase in electricity demand by installing them in power plants, power systems or buildings. The redox flow battery is a very powerful energy storage technology which can be combined freely as necessary and also a system suitable for large-scale energy storage.

Such Redox flow battery consists of two separated electrolytes. One electrolyte stores electroactive materials from the negative-electrode reaction while the other is used in the positive-electrode reaction.

In the real redox flow battery, electrolytes reactions in the cathode and the anode differ from each other, generating a pressure difference between the cathode and the anode due to the flow phenomenon of an electrolytic solution In an all-vanadium redox flow battery, a representative redox flow battery, the reactions of catholyte and anolyte may be expressed as follows:

Catholyte:

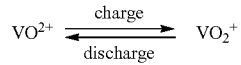

Anolyte:

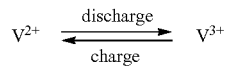

Therefore, to overcome the pressure difference between both electrodes and to enable an excellent cell performance regardless of repeated charging and discharging, a separation membrane with improved physical and chemical durability is needed. However, when the thickness of a separation membrane is increased to improve the physical durability, it results in an increased resistance.

DISCLOSURE

Technical Problem

The present inventors developed an ion conducting polymer in the form of a partially branched block copolymer, considering that the important characteristics of a polymer can vary when the polymer is branched compared to those of a linear polymer. Subsequently, they prepared a polymer membrane having improved conductivity and superior physical properties such as tensile strength, elongation at break, etc., while having the same or similar ion-exchange capacity (IEC), percentage water absorption and/or degree of dimensional change compared to conventional ion conducting polymers in the form of linear block copolymers. Thus, the present invention was completed upon confirming such polymer membrane can be used in a membrane-electrode assembly for a fuel battery or in a redox flow battery after being incorporated as a separation membrane, and can exhibit outstanding cell performance while maintaining excellent mid/long-term durability.

Technical Solution

In a first aspect, the present invention provides an ion conducting polymer comprising a partially branched block copolymer, wherein the partially branched block copolymer comprises a first block comprising a hydrophilic first polymer; a second block derived from a hydrophobic second polymer having two or more reactive groups participating in a polymerization reaction at each of its both ends to provide branching points for forming side branches on a main chain; and optionally a third block comprising a hydrophobic third polymer, which is characterized by the first block represented by Formula 1 below, the hydrophobic second polymer represented by Formula 2 below, and the third block represented by Formula 3 below:

[Formula 1]

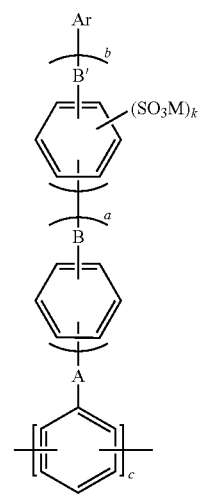

-continued

[Formula 2]

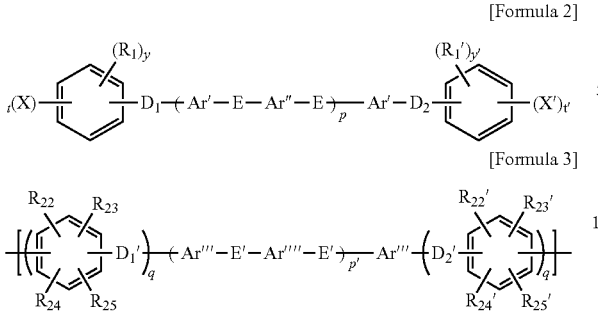

[Formula 3]

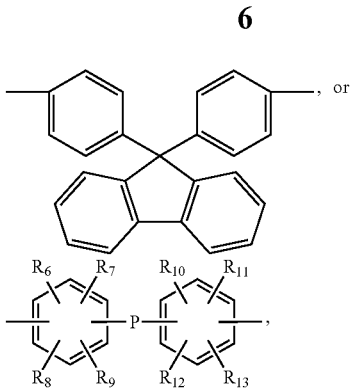

wherein, in Formula 1,

A is a single bond or —(C=O)—, —(P=O)—, —(SO$_2$)—, —CF$_2$—, or —(C(CF$_3$)$_2$)— as an electron withdrawing group;

B and B' are each independently a single bond or —O—, —S—, —NH—, or —NR$_{26}$— as an electron donating group, wherein R$_{26}$ is C$_{1-6}$ alkyl;

M is H or an alkali metal;

Ar is an aromatic molecule or a group of aromatic molecules substituted with at least one sulfonic acid group (—SO$_3$H) or an alkali metal salt thereof;

a and b are each an integer ranging from 0 to 10, k is an integer ranging from 1 to 4; and c is an integer ranging from 1 to 10,000, in Formula 2, D1 is a single bond, —O—, —S—, —NH—, or —NR$_{27}$— (wherein R$_{27}$ is C$_{1-6}$ alkyl) as an electron donating group, or

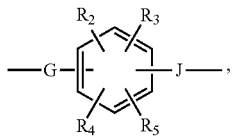

and D$_2$ is a single bond, —O—, —S—, —NH—, or —NR$_{27}$'— (wherein R$_{27}$' is C$_{1-6}$ alkyl) as an electron donating group, or

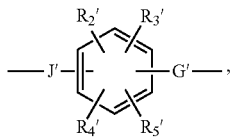

wherein G and G' are each independently a single bond or —(C=O)—, —(P=O)—, —(SO$_2$)—, —CF$_2$—, or —(C(CF$_3$)$_2$)— as an electron withdrawing group, and J and J' are each independently —O—, —S—, —NH—, or —NR$_{28}$— as an electron donating group, wherein R$_{28}$ is C$_{1-6}$ alkyl;

E is —O—, —S—, —NH—, or —NR$_{29}$— as an electron donating group, wherein R$_{29}$ is C$_{1-6}$ alkyl;

Ar' is unsubstituted or substituted with at least one substituent selected from the group consisting of a halogen atom (–X), C$_{1-6}$ alkyl, C$_{1-6}$ halogen-substituted alkyl, C$_{1-6}$ allyl, cyano, aryl, a sulfonic acid group, a phosphoric acid group (—PO$_3$H$_2$), an acetic acid group (—CO$_2$H), nitro (—NO$_2$), perfluoroalkyl, perfluoroalkylaryl, perfluoroaryl and —O-perfluoroaryl, aryl, naphthyl, anthracenyl, wherein the C$_{1-6}$ alkyl, C$_{1-6}$ perfluoroalkyl and C$_{1-6}$ perfluoroalkylaryl optionally comprise at least one oxygen, nitrogen or sulfur atom in its chain, and P is a single bond, —O—, —S—, —NH—, or —NR$_{30}$— (wherein R$_{30}$ is C$_{1-6}$ alkyl) as an electron donating group, or —(C=O)—, —(P=O)—, —(SO$_2$)—, —CF$_2$—, —(C(CH$_3$)$_2$)—, or —(C(CF$_3$)$_2$)— as an electron withdrawing group;

Ar'' is unsubstituted or substituted with at least one substituent selected from the group consisting of a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl and —O-perfluoroaryl, aryl, naphthyl, anthracenyl,

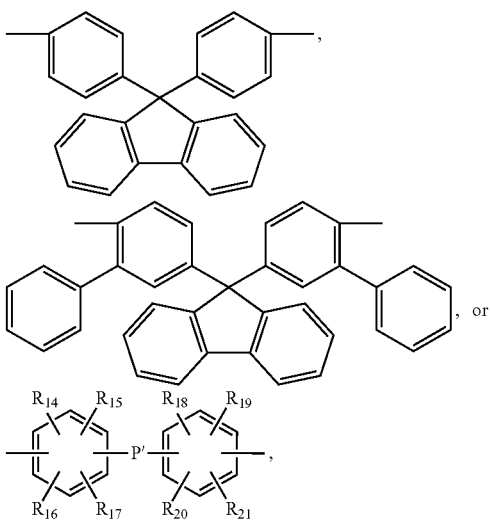

wherein the alkyl, perfluoroalkyl, and perfluoroalkylaryl optionally comprise at least one oxygen, nitrogen, or sulfur atom in its chain, and P' is a single bond, —O—, —S—, —NH—, or —NR$_{31}$— (wherein R$_{31}$ is C$_{1-6}$ alkyl) as an electron donating group, or —(C=O)—, —(P=O)—, —(SO$_2$)—, —CF$_2$—, —(C(CH$_3$)$_2$)—, or —(C(CF$_3$)$_2$)— as an electron withdrawing group;

R$_1$ and R$_1$' are each independently a hydrogen atom, a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl, or —O-perfluoroaryl, wherein the alkyl, perfluoroalkyl and perfluoroalkylaryl optionally comprise at least one oxygen, nitrogen, or sulfur atom in their chain;

X and X' are each independently a halogen atom;

$R_2$ to $R_{21}$ and $R_2'$ to $R_5'$ are each independently a hydrogen atom, a halogen atom, $C_{1-6}$ alkyl, $C_{1-6}$ halogen-substituted alkyl, $C_{1-6}$ allyl, cyano, aryl, a sulfonic acid group, a phosphoric acid group, an acetic acid group, nitro, $C_{1-6}$ perfluoroalkyl, $C_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain; wherein, in Formula 1 or Formula 2, the sulfonic acid group, the phosphoric acid group, and the acetic acid group may be in the form of an alkali metal salt;

p is an integer ranging from 1 to 1000, t and t' are each independently an integer ranging from 2 to 5, and y and y' are each independently an integer ranging from 0 to 3, while the combinations of numbers are represented by t+y=5 and t'+y'=5; and in Formula 3, $D_1'$ and $D_2'$ may be each introduced with a functional group in the same range as that of $D_1$ and $D_2$ of Formula 2, wherein each of $D_1$ and $D_1'$, and $D_2$ and $D_2'$ may be same with or different from each other;

Ar''' may be introduced with a functional group having the same range as that of Ar' of Formula 2, wherein Ar' and Ar''' may be identical to or different from each other;

Ar'''' may be introduced with a functional group in the same range as that of Ar'' of Formula 2, wherein Ar'' and Ar'''' may be identical to or different from each other;

E' is as an electron donating group and may be introduced with a functional group in the same range as that of E of Formula 2, wherein E and E' may be identical to or different from each other; and $R_{22}$ to $R_{25}$ and $R_{22}'$ to $R_{25}'$ are each independently a hydrogen atom, a halogen atom, $C_{1-6}$ alkyl, $C_{1-6}$ halogen-substituted alkyl, $C_{1-6}$ allyl, cyano, aryl, a sulfonic acid group, a phosphoric acid group, an acetic acid group, nitro, $C_{1-6}$ perfluoroalkyl, $C_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain;

the sulfonic acid group, the phosphoric acid group, and the acetic acid group in Formula 3 may be in the form of an alkali metal salt; and q and q' are each independently an integer ranging from 0 to 5, and p' is an integer ranging from 1 to 1000.

Further, the second aspect of the present invention provides a compound comprising a repeating unit represented by Formula 4 below:

[Formula 4]

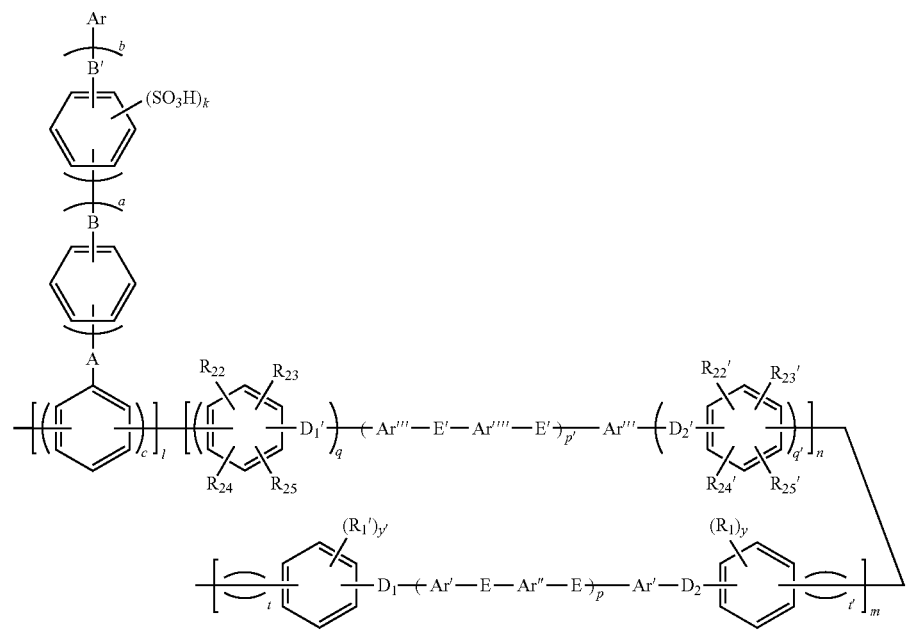

wherein, in Formula 4, each abbreviation is the same as described in Formula 1 to 3;

l and m are independently an integer of 1 or higher;

n is an integer of 0 or higher; and t and t' correspond to t and t' which represent the number of substituent X or X' in a monomer represented by Formula 2, respectively, and are a number of branching bonds to neighboring blocks.

In the present invention

is an illustrative notation to indicate branching bonds to t number of neighboring blocks from a branching point. Thus, the polymer represented by Formula 4 can generate branching bonds to respectively t or t' number of neighboring blocks from each phenyl ring located on its both ends which is the branching point.

For example,

is an illustrative notation to indicate branching bonds to two neighboring blocks from a branching point. Thus, the polymer represented by Formula 4 can generate branching bonds to respectively 2 of neighboring blocks from the branching point. For example, while one bonding site of a branching point participating in forming a main chain backbone, another bonding site can form a branching bond to other hydrophilic or hydrophobic blocks therethrough.

Furthermore, in a third aspect, the present invention provides a method for preparing the ion conducting polymer according to the first aspect of the present invention. It provides a preparation method comprising preparing a hydrophilic monomer which forms the hydrophilic first polymer; preparing a hydrophobic second polymer; optionally preparing a hydrophobic third polymer; and forming a partially branched block copolymer via Colon coupling reaction by mixing the hydrophilic monomer, the hydrophobic second polymer, and optionally the hydrophobic third polymer.

Furthermore, in a fourth aspect, the present invention provides an ion conductor comprising an ion conducting polymer according to the first aspect of the present invention.

The ion conductor may be a shaped article prepared using a resin composition comprising an ion conducting polymer of the present invention. The shaped article may be an electrolyte membrane, a separation membrane or a water-treatment membrane.

Furthermore, in a fifth aspect, the present invention provides an electrolyte membrane prepared from an ion conducting polymer according to the first aspect of the present invention.

Furthermore, in a sixth aspect, the present invention provides a membrane-electrode assembly comprising the electrolyte membrane according to the fifth aspect of the present invention.

Furthermore, in a seventh aspect, the present invention provides a battery comprising a membrane-electrode assembly according to the sixth aspect of the present invention.

Furthermore, in an eighth aspect, the present invention provides a separation membrane for redox flow battery prepared from an ion conducting polymer according to the first aspect of the present invention.

Furthermore, in a ninth aspect, the present invention provides a redox flow battery consisting of a cathode, a catholyte, a separation membrane according the eighth aspect of the present invention, an anode, and an anolyte.

Hereinbelow, the present invention will be described in detail.

An ion conducting polymer of the present invention comprising a partially branched block copolymer comprises: a first block consisting of a hydrophilic first polymer; a second block derived from a hydrophobic second polymer having two or more reactive groups participating in a polymerization reaction at each of its both ends to provide branching points for forming side branches on a main chain; and optionally a third block consisting of a hydrophobic third polymer.

For example, unlike a conventional linear block copolymer comprising a hydrophilic and hydrophobic blocks prepared using a hydrophilic polymer containing one reactive group respectively participating in polymerization on its both end, and a hydrophobic polymer containing one reactive group respectively participating in polymerization on its both ends, in an embodiment, the present invention is characterized by forming a partially branched block copolymer by additionally using a hydrophobic polymer comprising two or more reactive groups respectively participating in polymerization reaction at each of its both ends in order to form branching points for forming side branches on a main chain.

The partially branched block copolymer (a) and the conventional linear block copolymer (b) according to an embodiment are depicted in FIGS. 1A and 1B.

The partially branched block copolymer can form branches only in particular parts of the block copolymer but not from the entire block copolymer because of including at least one unbranched block polymer out of at least two block polymers forming the block copolymers.

The partially branched block copolymer according to the present invention can have advantageous characteristics of both a block copolymer and a branched polymer. That is, it not only enables to have a densely and locally sulfonated structure thus having the property of excellent micro-phase separation, which occurs effectively between a hydrophilic domain and a hydrophobic domain, but also has a higher solubility in organic solvents due to increased amorphousity compared to that of a conventional linear block copolymer. Accordingly, the process of preparing a membrane on the basis of a solution process can be made more readily.

The branched block copolymer may be in a comb-like shape. In the case of a heavily-branched block copolymer, additional branch may extend out of an existing branch, thereby forming a shape of a tree branch. In addition, it can be characterized by a linearly branched shape, an inter-crosslinked net-like shape, or a combination thereof.

Preferably, the partially branched block copolymer according to the present invention is comprised of a hydrophilic first block formed by a strong carbon-carbon bond, and a hydrophobic second block and/or a hydrophobic third block formed by polyarylene ether having a flexible ether bond. If the first block consisting of a hydrophilic first polymers, is formed by a strong carbon-carbon bond, it would have an excellent dimensional stability. Further, it has an excellent chemical stability to various radicals because an ether bond is not included at the neighboring site of a phenyl ring substituted with sulfonic acid. When such block copolymer partially consisting of the hydrophilic first block is used, it exhibits high conductivity, and simultaneously enables to provide an electrolyte membrane for batteries with excellent chemical stability. Meanwhile, because the hydrophobic second block and/or hydrophobic third block contains polyarylene ether, which contains ether bond as a backbone, the polymer can have flexibility.

The polymer according to the present invention may be a polymer in which the repeating units of the above first to third blocks are arranged randomly, alternatively or sequentially, or may be a block copolymer. If sufficiently limited, the molar ratio of each repeating unit may change variously.

According to the present invention, the first block (hydrophilic block oligomer) consisting of a hydrophilic first polymer is represented by Formula 1, and may be a polymer composed of monomers consisting of at least one aryl group substituted with at least one sulfonic acid group ($-SO_3H$) or alkali metal salt thereof in its chain while having a phenylene repeating unit as a backbone.

Ar, which was introduced to Formula 1 to obtain hydrophilicity, may be a phenyl, naphthyl, thiophenyl or pyridinyl substituted with at least one sulfonic acid group or alkali metal salt thereof, but is not limited thereto.

Proton (H⁺) conductivity may be rendered to the hydrophilic first block through the introduced sulfonic acid group or an alkali metal salt thereof. The "alkali metal salt (—SO₃M, M=Na, K, Li, etc.)" may be replacing the proton in sulfonic acid with a cation of an alkali group metals such as Na, Ka, Li, Rb, Cs or Fr, etc. Preferably, the alkali metal salt may be a sodium salt.

Meanwhile, due to the hydrophilicity of sulfonic acid group and an alkali metal salt thereof, when the percentage of the hydrophilic first polymer within a polymer is high, the water-resistance of the polymer electrolyte membrane prepared therefrom becomes deteriorated, and the swelling due to increase in water content deteriorates mechanical strength and integration degree, thus being unable to meet the physical properties of the polymer electrolyte membrane required during a fuel cell operation. The polymer of the present invention can provide a mechanical strength by including a hydrophobic second block (hydrophobic block oligomer) consisting a polymer represented by Formula 2, and/or hydrophobic third block (hydrophobic block oligomer) represented by Formula 3.

In an embodiment, the partially branched block copolymer of the present invention showed an improvement in conductivity by about 20% and improved physical properties, for example, tensile modulus, also known as Young's modulus, tensile strength, and elongation at break compared to the linear block copolymer, which has the same exchange capacity (IEC) as that of the present invention, and a similar water absorption rate or degree of dimensional change.

Preferably, the ion conducting polymer according to the present invention may have a molecular weight ranging from 10,000 to 1,000,000 in terms of number-average molecular weight (Mn) or from 10,000 to 10,000,000 in terms of weight-average molecular weight (Mw). When it has a low molecular weight i.e., 10,000 or less, forming a film may be difficult, moisture content may increase, and the ion conducting polymer may be readily decomposed by radical attacks, thereby reducing its conductivity and durability. On the other hand, when it has a high molecular weight i.e., 1,000,000 or more, the preparation of a polymer solvent and film forming may be difficult due to a rapid increase in viscosity, and thus a membrane preparation process may be impossible.

Because the weight average molecular weight and viscosity average molecular weight show similar values to each other, in an embodiment of the present invention, the molecular weight was estimated by measuring the intrinsic viscosity of polymers. The molecular weight may be measured by gel permeation chromatography (GPC). However, when a polymer is substituted with sulfonic acid groups as the polymer in the present invention, there occurs an interaction between sulfonic acid groups, and thus the resulting data may not be reliable. Thus, the molecular weight was estimated by measuring its intrinsic viscosity.

In a hydrophobic second polymer having two or more reactive groups respectively participating in polymerization on its both ends in order to form a branching point forming branches on a main chain, the reactive group is preferably a halogen atom. When a halogen atom is introduced as a substituent in an organic compound, it becomes very reactive due to its high electronegativity gained from the high effective nuclear charge and high reactivity, and thus the halogen substituent is introduced broadly in places for condensation and substitution reactions. The halogen atom may be fluorine (F), chlorine (Cl), bromine (Br), iodine (I), etc. X and X' of Formula 2 may be each independently a halogen atom, and more preferably, the halogen atom may be a chlorine atom, respectively.

Meanwhile, a heavy branching may promote gelation of a polymer. Gelation occurs by a cross-coupling system, and has difficulty in forming because gel does not flow in a steady-state, unlike a liquid. Accordingly, the ion conducting polymer according to the present invention may further include a hydrophobic third block copolymer represented by Formula 3 to prevent gelation due to the heavy branching. t may be an integer equal to or greater than 2 and less than 5, and preferably 2.

In an embodiment, the partially branched block copolymer of the present invention may be represented by Formula 4 below.

[Formula 4]

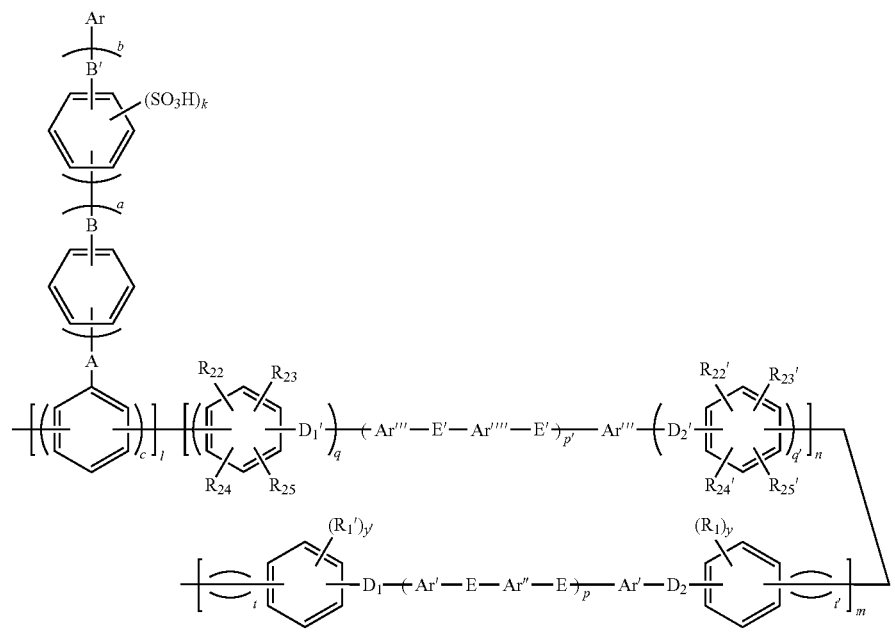

Preferably, the partially branched block copolymer according to the present invention represented by Formula 4 has a ratio between the total number of monomers forming all hydrophilic first blocks (1): the sum (m+n) of the hydrophobic second polymer and the hydrophobic third polymer to be from 0.1:1 to 100:1. For example, when the molar ratio is less than 0.1:1, there is little ion conductivity, whereas when the molar ratio is greater than 100:1, the polymer becomes dissolved in water and thus cannot be served as an actual membrane as. More preferably, partially branched block copolymer may be prepared with molar ratios 0.1:1 to 50:1, and most preferably 0.1:1 to 30:1

In order to prevent gelation caused by heavy branching, the ratio of the number of the hydrophobic second block to the hydrophobic third block is such that a ratio of branched hydrophobic second block does not exceed 50%. Further, a ratio greater than 2 is preferred in order to have effective phase-separation and increase in molecular weight. The relationship between n and m can be represented as follows: preferably, $0.5 \leq n/(m+n) < 1$.

In an embodiment of the partially branched block copolymer represented by Formula 4, A is —(C=O)—; Ar is phenyl substituted with a sulfonic acid group or a sodium salt thereof; both a and b are 0, D1 and D2 are both of —O— or respectively

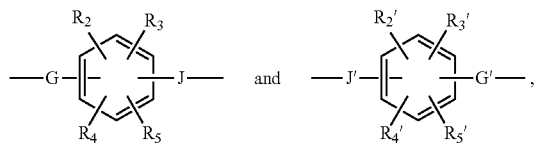

wherein both G and G' are —(C=O)—, and both J and J' are —O—; Ar' is an unsubstituted aryl, naphthyl,

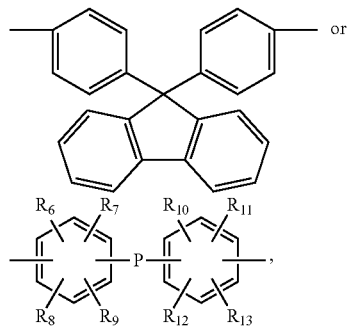

wherein P is a single bond, —(C=O)—, —(SO$_2$)—, —(C(CH$_3$)$_2$)— or —(C(CF$_3$)$_2$)—; Ar" is

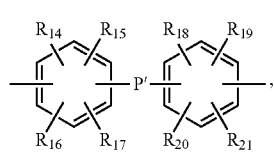

wherein P' is —(C=O)— or —(SO$_2$)—; E is —O—; R$_1$ to R$_{21}$ are all hydrogen atoms; p is an integer ranging from 1 to 50, t is 2, and y is 3, when q is 1, D$_1$' and D$_2$' are both —O— or respectively

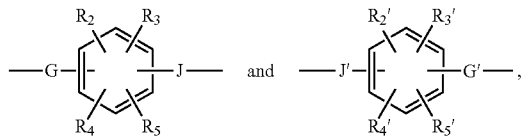

wherein both G and G' are —(C=O)—, both J and J' are —O—; Ar''' is an unsubstituted aryl, naphthyl,

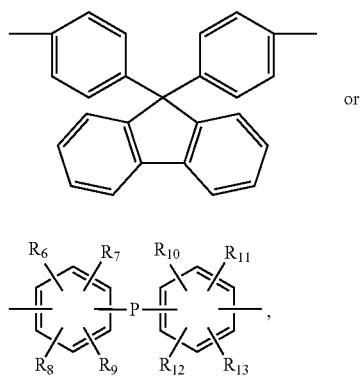

wherein P is a single bond, —(C=O)—, —(SO$_2$)—, —(C(CH$_3$)$_2$)— or —(C(CF$_3$)$_2$)—; Ar'''' is

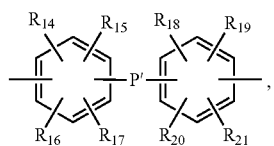

wherein P' is a —(C=O)— or —(SO$_2$)—; E is —O—; R$_2$ to R$_{25}$ are all hydrogen atoms; p' is an integer ranging from 1 and 50, or when q is 0, Ar''' is

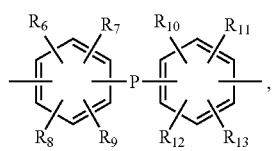

wherein P' is a —(C=O)— or —(SO$_2$)—; Ar'''' is an unsubstituted aryl group, naphthyl group,

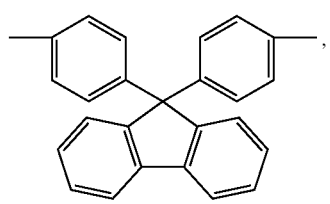

-continued

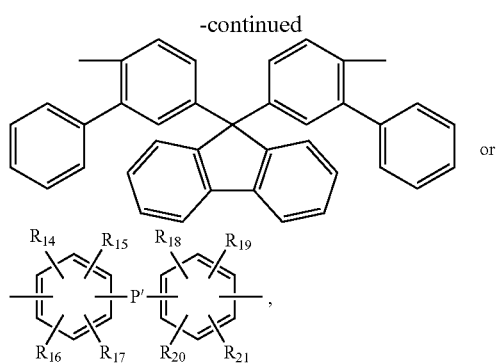

or wherein P' is a single bond, —(C=O)—, —(SO$_2$)—, —(C(CH$_3$)$_2$)— or —(C(CF$_3$)$_2$)—; E is —O—; R$_2$ to R$_{25}$ are all hydrogen atoms; p' is an integer ranging from 1 to 50.

According to the present invention, a hydrophilic first block may be a polymer formed by monomers of 3-(2,5-dichlorobenzoyl)benzenesulfonic acid or sodium 3-(2,5-dichlorobenzoyl)benzenesulfonic acid thereof or sodium 3-(2,5-dichlorobenzoyl)benzenesulfonate (M1), but is not limited thereto.

According to the present invention, the hydrophobic second block may be selected from one or more compounds represented by Formulae 5 to 30 below.

[Formula 5]
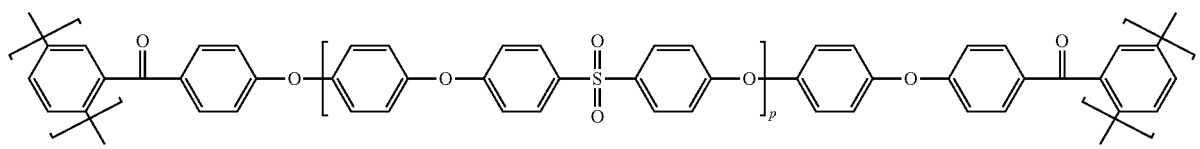

[Formula 6]
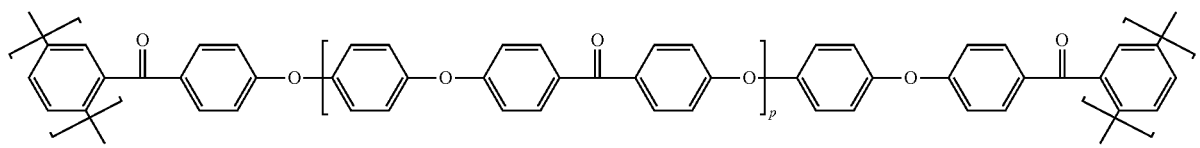

[Formula 7]
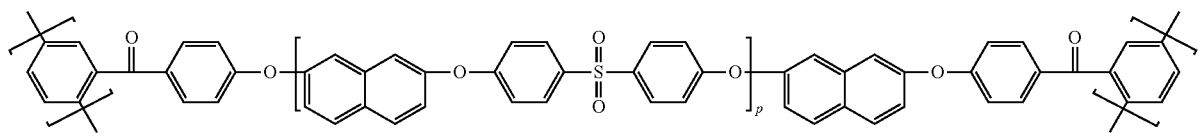

[Formula 8]
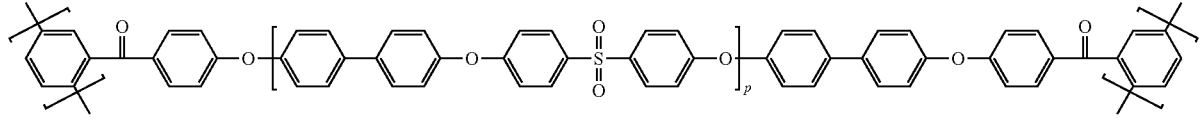

[Formula 9]
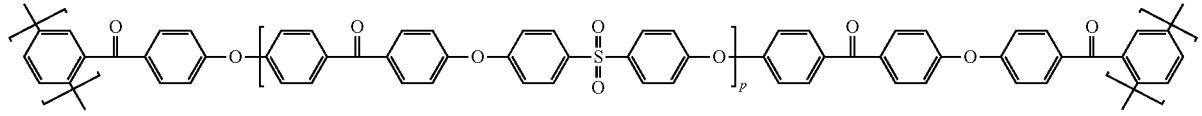

[Formula 10]
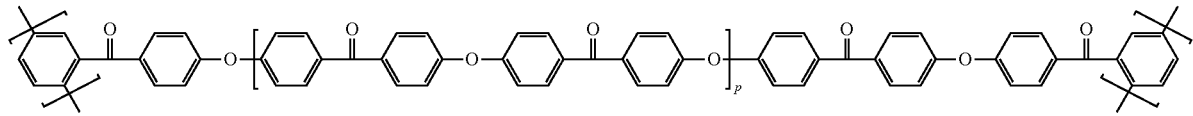

[Formula 11]
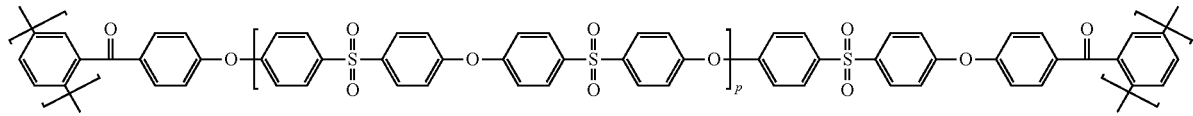

[Formula 12]
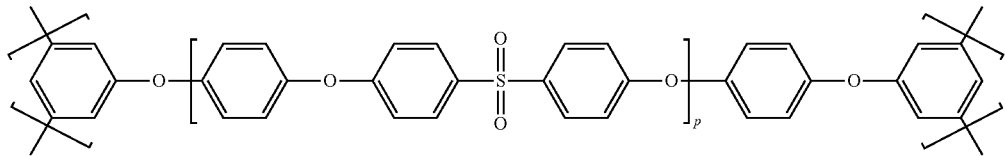
[Formula 13]
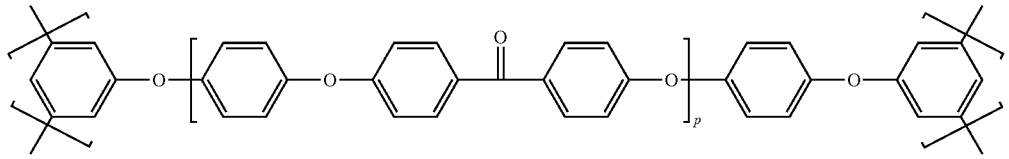
[Formula 14]
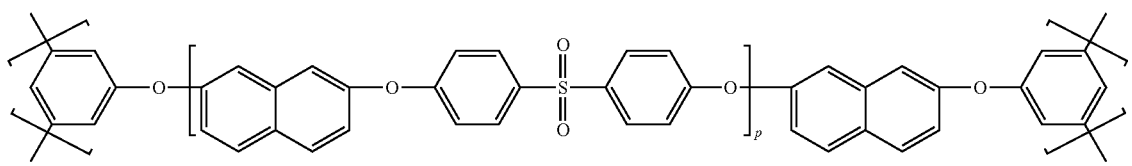
[Formula 15]
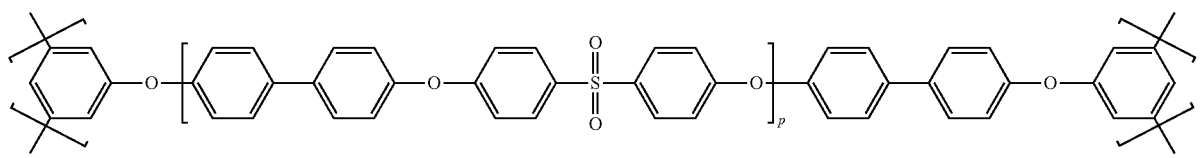
[Formula 16]
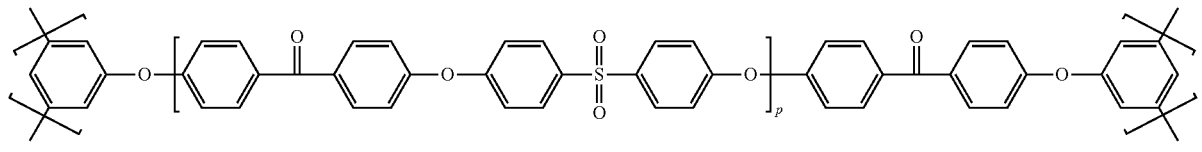
[Formula 17]
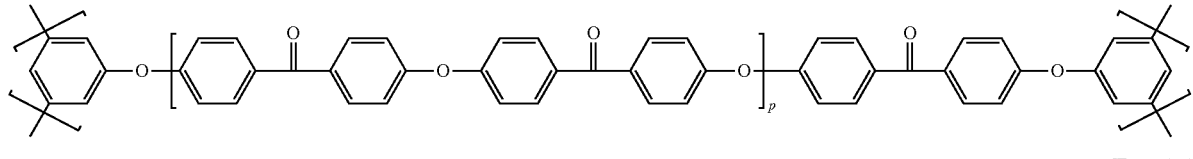
[Formula 18]
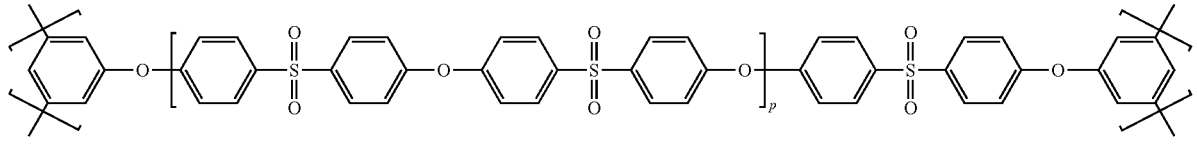
[Formula 19]
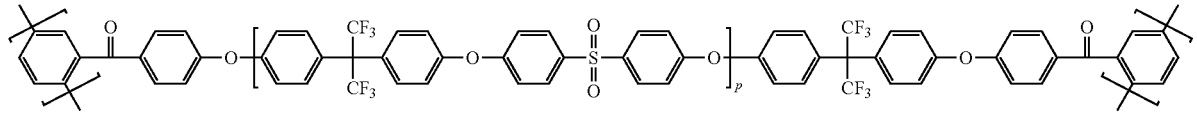
[Formula 20]
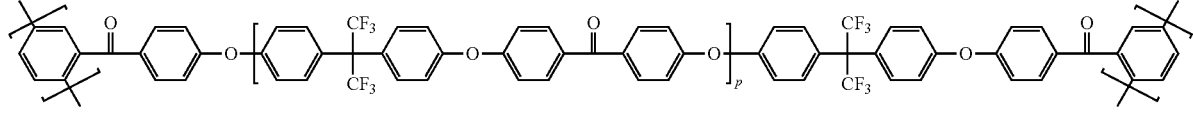

[Formula 21]
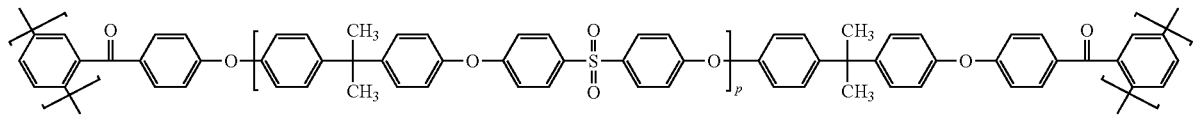
[Formula 22]
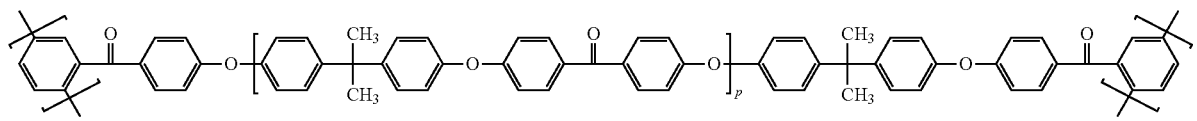
[Formula 23]
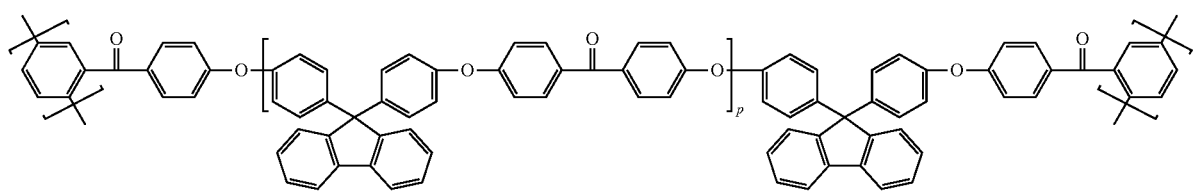
[Formula 24]
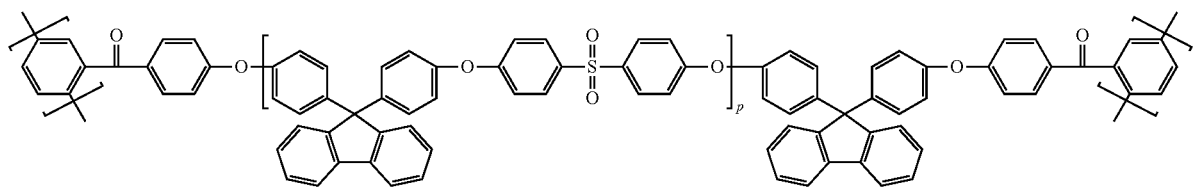
[Formula 25]
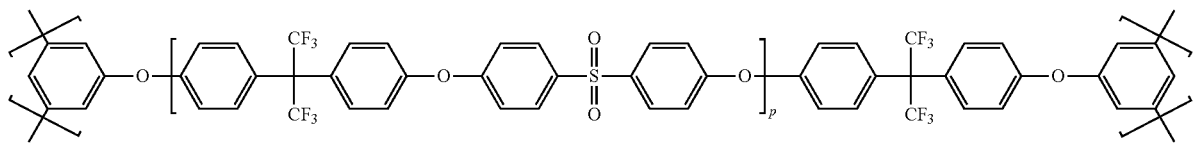
[Formula 26]
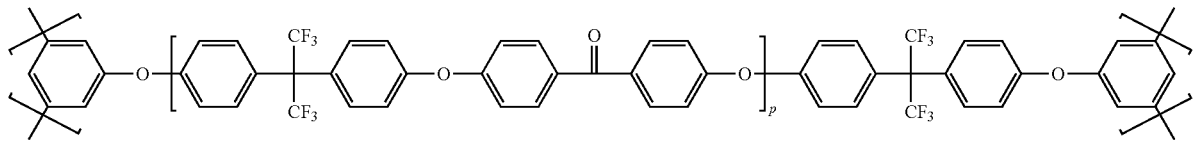
[Formula 27]
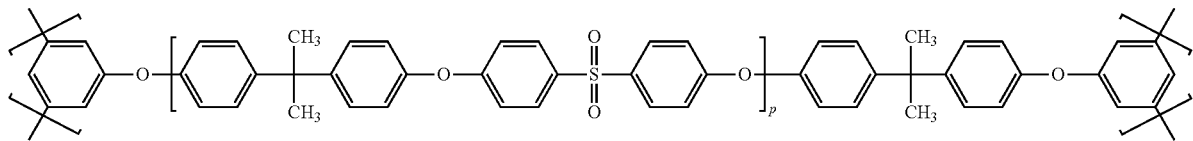
[Formula 28]
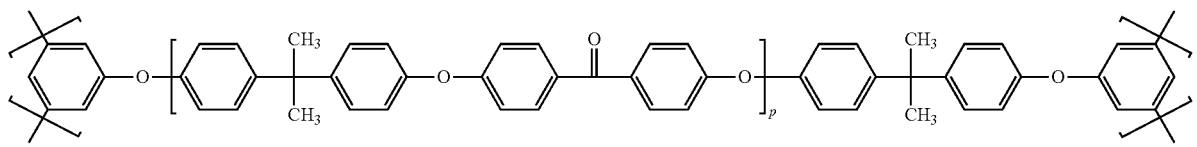

[Formula 29]
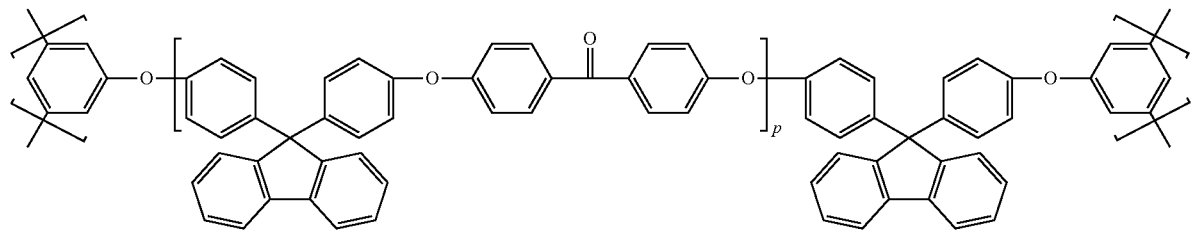
[Formula 30]
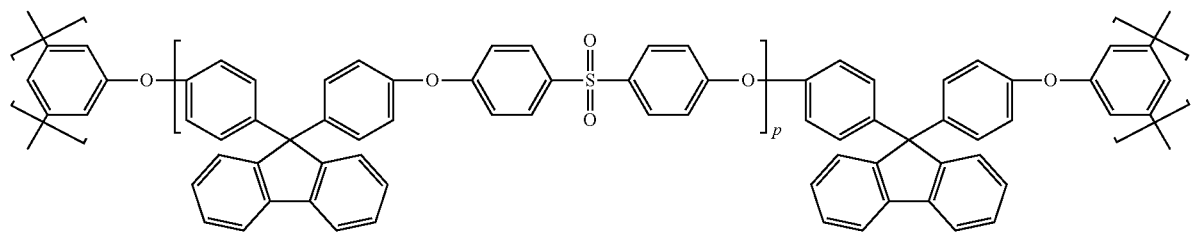
According to the present invention, the hydrophobic third block may be selected from one or more compounds represented by Formulae 31 to 75 below.
[Formula 31]
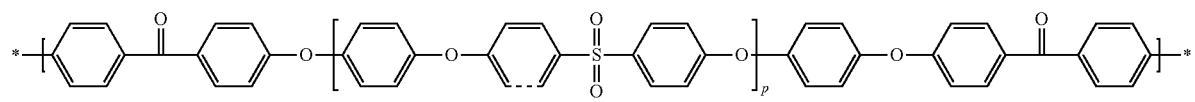
[Formula 32]
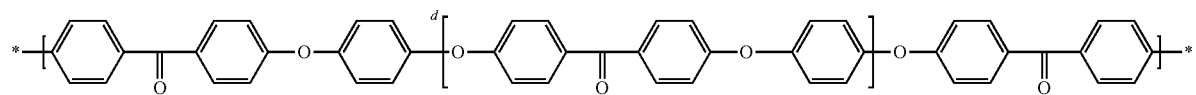
[Formula 33]
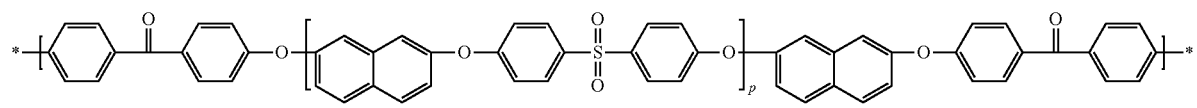
[Formula 34]
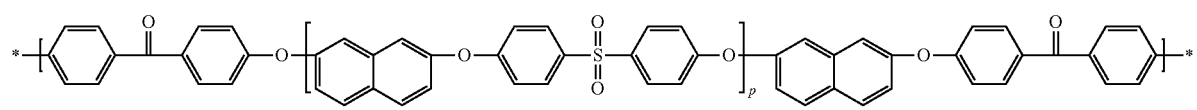
[Formula 35]
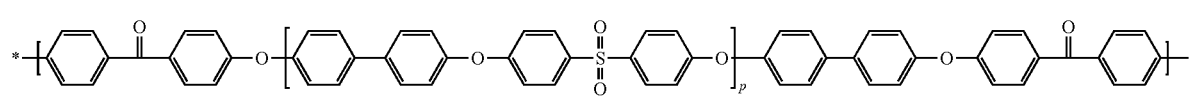
[Formula 36]
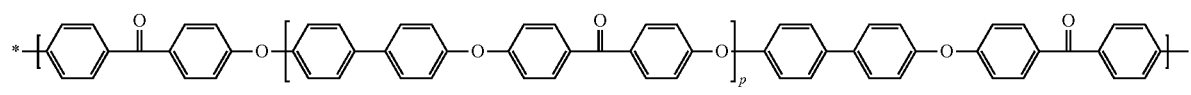
[Formula 37]
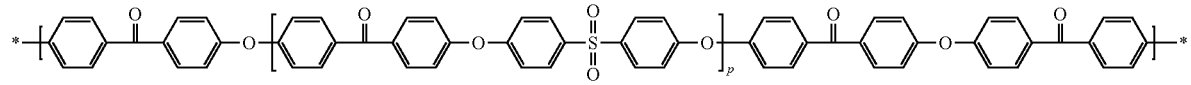

[Formula 38]
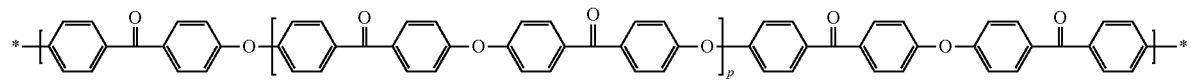
[Formula 39]
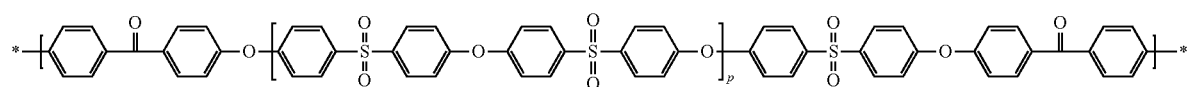
[Formula 40]
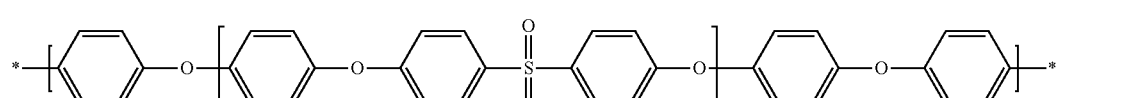
[Formula 41]
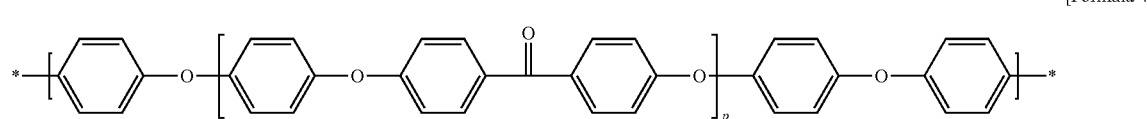
[Formula 42]
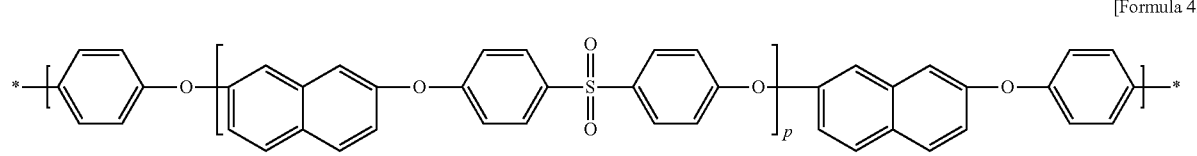
[Formula 43]
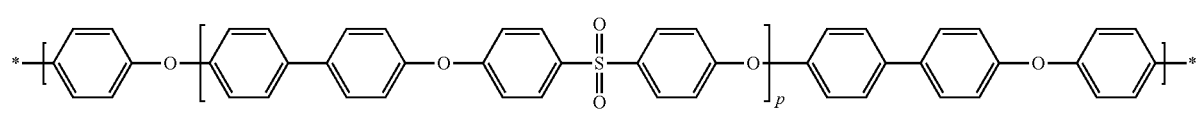
[Formula 44]
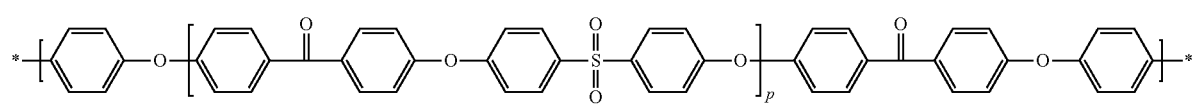
[Formula 45]
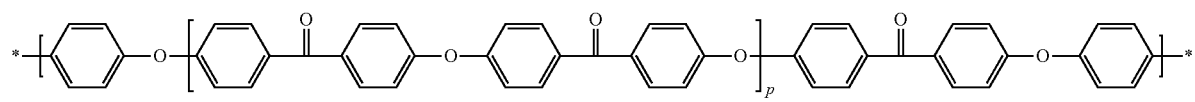
[Formula 46]
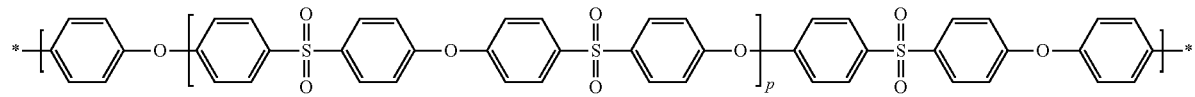
[Formula 47]
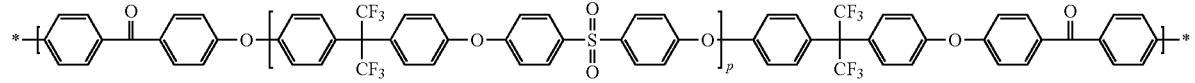
[Formula 48]
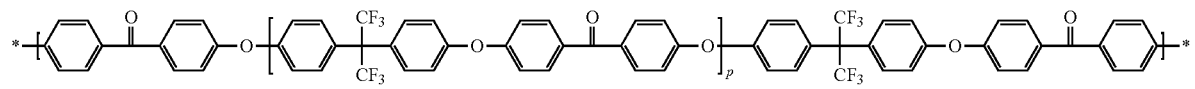
[Formula 49]
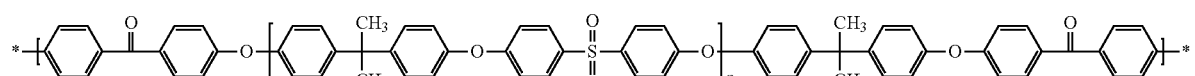

-continued
[Formula 50]
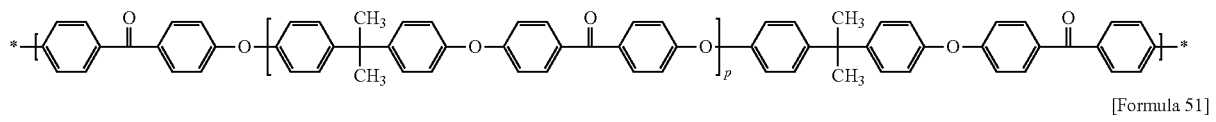
[Formula 51]
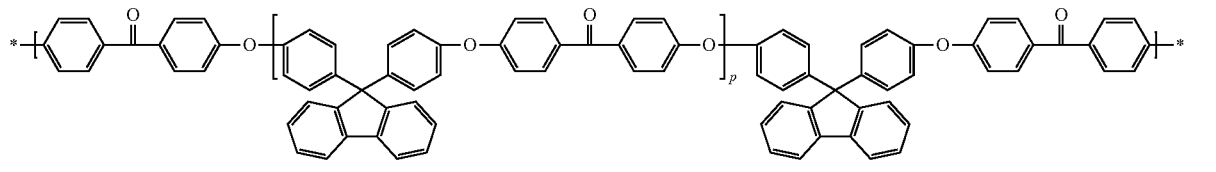
[Formula 52]
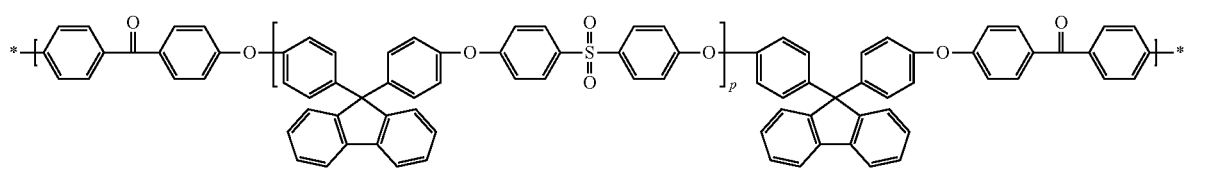
[Formula 53]
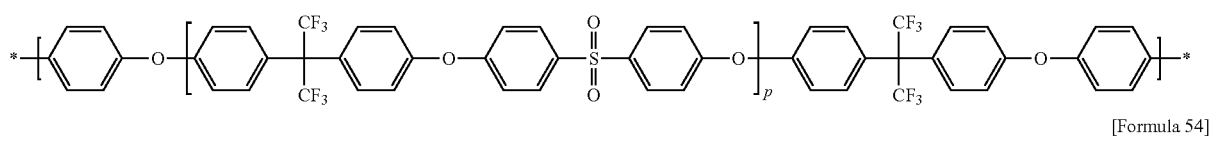
[Formula 54]
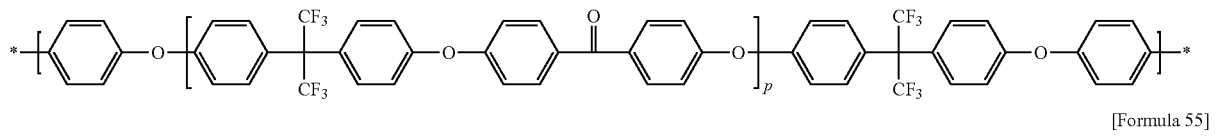
[Formula 55]
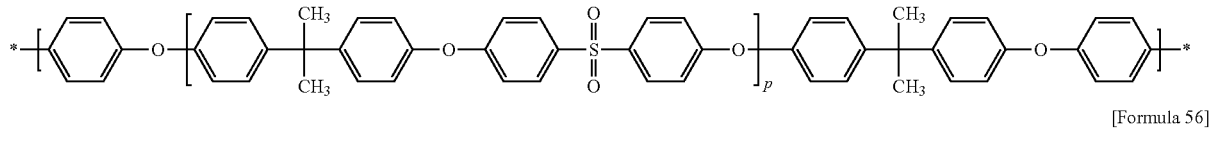
[Formula 56]
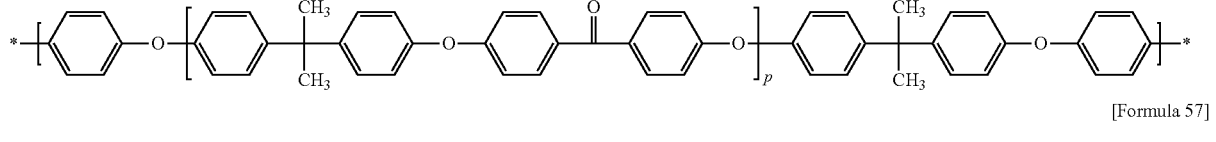
[Formula 57]
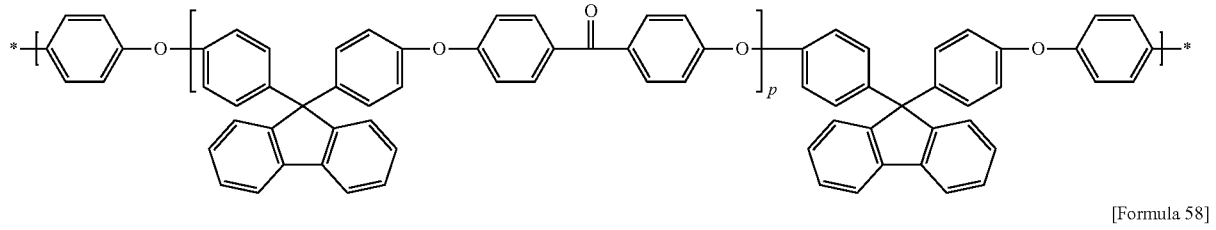
[Formula 58]
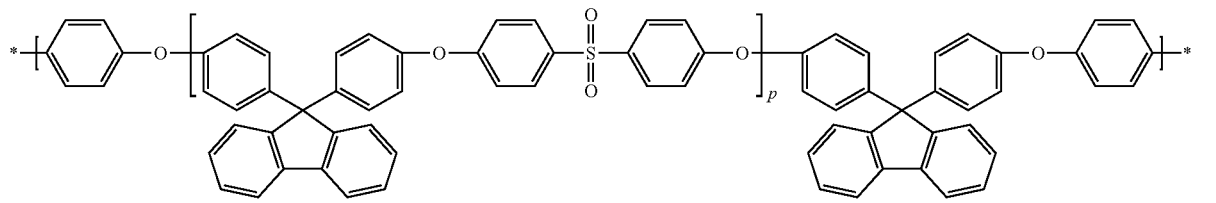
[Formula 59]
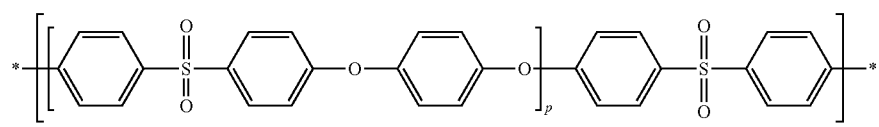

[Formula 60]
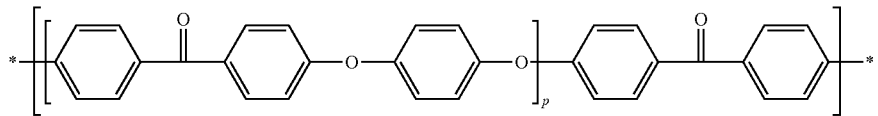
[Formula 61]
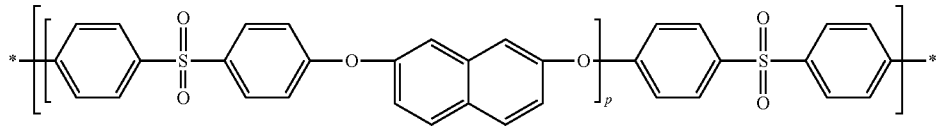
[Formula 62]
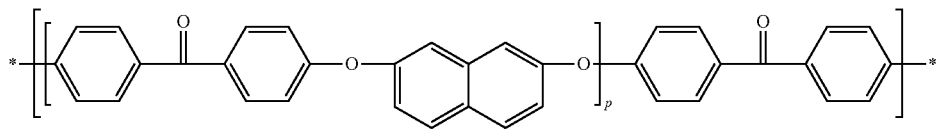
[Formula 63]
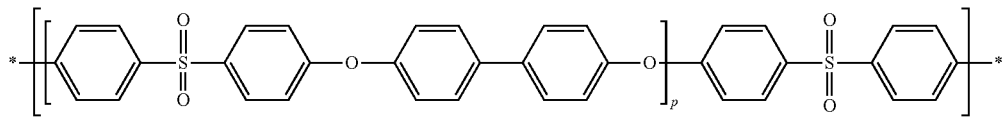
[Formula 64]
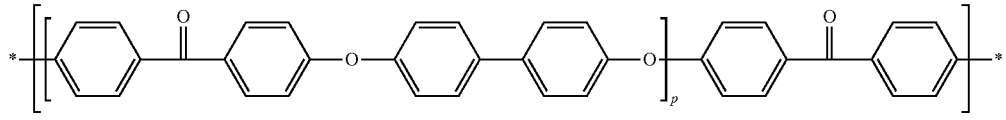
[Formula 65]
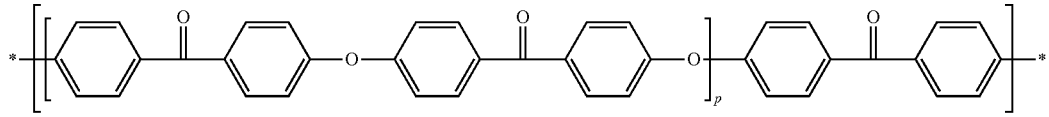
[Formula 66]
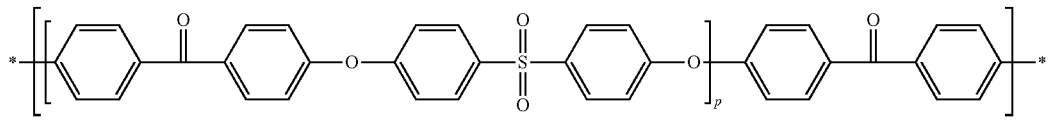
[Formula 67]
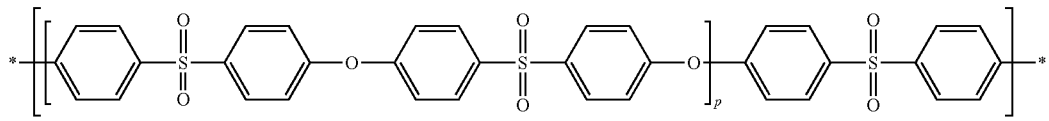
[Formula 68]
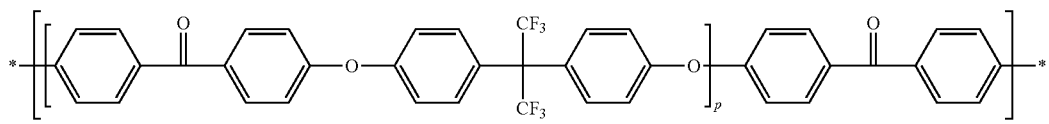
[Formula 69]
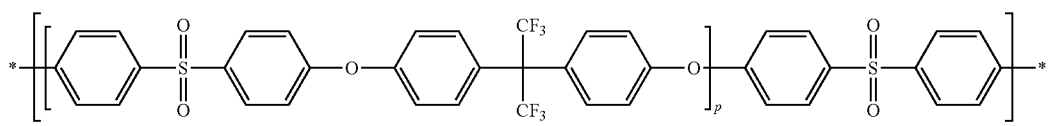
[Formula 70]
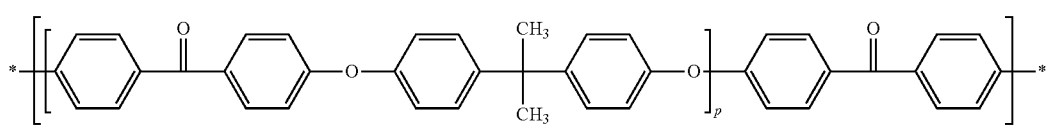

[Formula 71]

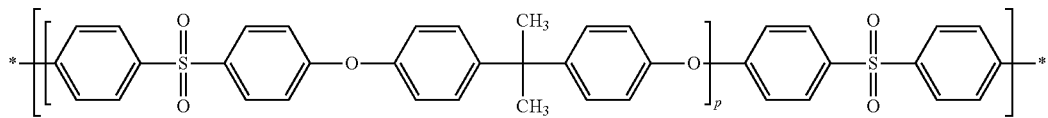

[Formula 72]

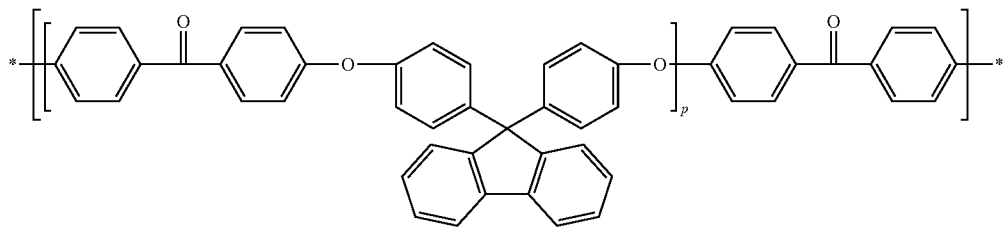

[Formula 73]

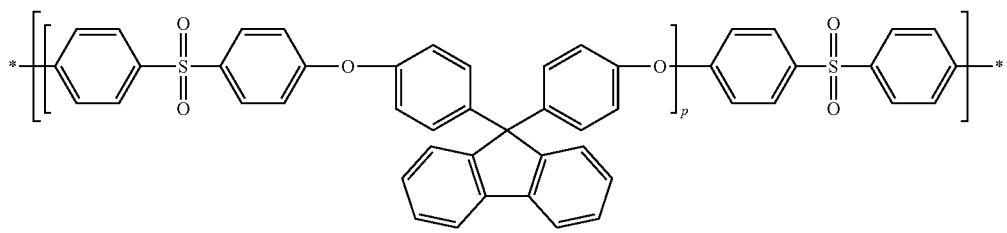

[Formula 74]

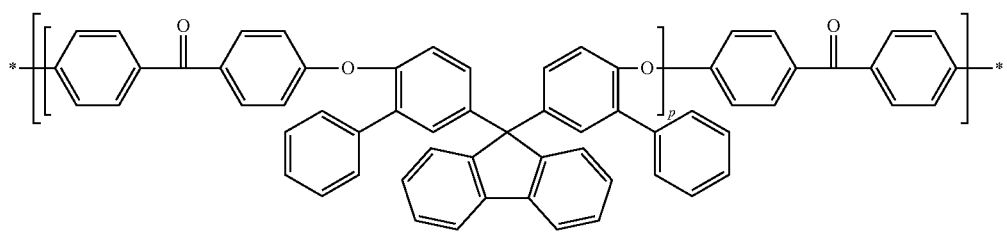

[Formula 75]

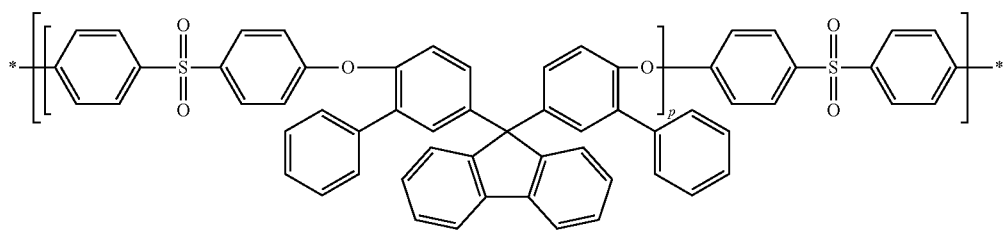

The method for preparing an ion conducting polymer according to the present invention comprises: preparing a hydrophilic monomer which forms the hydrophilic first polymer; preparing a hydrophobic second polymer; optionally preparing a hydrophobic third polymer; and forming a partially branched block copolymer via a Colon coupling reaction by mixing the hydrophilic monomer, hydrophobic second polymer and optionally hydrophobic third polymer.

A distinctive feature of the method for preparing an ion conducting polymer according to the present invention is that, the hydrophilic first polymer is not prepared separately. A general method for preparing a block copolymer includes a process, wherein each of blocks forming a polymer is prepared separately, and they are reacted with each other to form a block copolymer. However, according to the preparation method, a partially branched block copolymer including the hydrophilic block and the hydrophobic block can be prepared by a direct reaction of the monomers forming the hydrophilic first polymer with the hydrophobic second polymer and/or the hydrophobic third polymer without the process of preparing the hydrophilic first polymer separately. For example, even when the hydrophilic monomers are reacted with the hydrophobic second polymer and/or the hydrophobic third polymer, there is a higher probability of interaction among hydrophilic monomers having similar physical properties. Thus, the hydrophilic monomers are preferentially reacted with each other to form a hydrophilic polymer, and are then combined with the hydrophobic second polymer and/or the hydrophobic third polymer, which have been reacted together, to form a block copolymer. Accordingly, the separation process for preparing the hydrophilic first polymers can be eliminated from the preparation method, and thus enables to achieve the effects of cost reduction and yield improvement.

The hydrophilic monomers in the first step may be synthesized or commercially available hydrophilic monomers may be purchased for use. They may also be prepared from monomers not containing sulfonic acid groups by further conducting a sulfonation step, and used. The sulfonation step may include reacting the monomers with concentrated sulfuric acid while stirring for 12 to 20 hours at 60 to 100° C.

The sulfonic acid group substituted to the hydrophilic monomer may be in the form of a proton or an alkali metal salt, and preferably in the form of a sodium salt, but is not limited thereto.

The second step can be accomplished by sub-steps comprising reacting at least one compound selected from a group consisting bis-sulfone and benzophenone, which are substituted with the same or different substituent of hydroxyl or halogen at 4 and 4' position, as a reactant with $K_2CO_3$ in a mixture of DMAc and toluene as a solvent, while stirring at 130 to 160° C. for 2 to 4 hours (step 1); and reacting the resulting product with a benzophenone, which is substituted with two chlorine atoms at different carbon atoms on one benzene ring and with a fluorine atom on another benzene ring respectively, or a benzene, which is substituted two chlorine atoms and a fluorine atom at different carbon atoms respectively, under the same conditions described above (step 2).

The reaction of the second step may be carried out by a nucleophilic substitution reaction between highly reactive hydroxyl groups or halogen groups substituted with a reactant in a similar way to the third step further stated below. Because the resulting product may also have a highly reactive halogen atom as a substituent on its end, it is necessary to control the reaction conditions to be mild and the reaction time to prevent over-polymerization. The technical feature of the step 2 of the second step is to introduce two or more reactive groups, capable of branching bond to hydrophilic blocks and/or other hydrophobic blocks. It is conducted using organic molecules substituted with a fluorine atom and two chlorine atoms at each carbon, thereby forming an additional backbone structure by a nucleophilic substitution reaction between an intermediate hydrophobic polymer and a relatively highly reactive fluorine atom. The two chlorine atoms can further serve as a reactive group for bonding with another polymer.

The third step can be accomplished by a sub-step comprising reacting at least one compound selected from a group consisting bis-sulfone and benzophenone, which are substituted with the same or different substituent of hydroxyl or halogen at 4 and 4' position, as a reactant with $K_2CO_3$ in a mixture of DMAc and toluene as a solvent, while stirring at 130 to 160° C. for 2 to 4 hours.

The reaction of the third step may be carried out by a nucleophilic substitution reaction between highly reactive hydroxyl groups or halogen groups substituted with a reactant. Because the resulting product may also have a highly reactive halogen atom as a substituent on its end, it is necessary to control the reaction conditions to be mild and the reaction time to prevent over-polymerization.

The first to third steps can be performed independently and do not need to be sequential, because the resulting product of each step is prepared separately by using different reactants but not using the product of any other step, thus the resulting product obtained at each step is not needed to conduct the subsequent step. Further, a precipitation, filtration and/or washing may be conducted additionally.

The Colon coupling reaction in the fourth step relates to preparation of a polyphenylene polymer by forming a carbon-carbon bonding by a reaction between the monomers and polymers prepared from the first to third steps, which include at least one halogen atom with a reducible metal in the presence of a catalyst. The reducible metal may be zinc (Zn), magnesium (Mg), manganese (Mn), aluminum (Al) or calcium (Ca), and 2,2'-bipyridine or triphenylphosphine ($PPh_3$ a.k.a TPP) may be used with $NiBr_2$, $NiCl_2$, $Br_2$, $(acac)_2.H_2O$, $(OOCCH_3).4H_2O$, $I_2.6H_2O$ or non-halide salts (F<Cl<Br<I) as a catalyst. Preferably, the fourth step may be conducted by reacting DMAc acting as solvent with $NiBr_2$, triphenylphosphine and zinc at 60 to 100° C. for 6 to 10 hours while stirring. In addition, a step of removing zinc, washing or drying can further be comprised after forming the block copolymer.

The ion conducting polymer according to the present invention may be used in the ion conductor by sulfonic acid group or an alkali metal thereof.

The ion conductor may be a shaped article formed of resin composition including an ion conducting polymer of the present invention. Non-limiting examples of the shaped article may be an electrolyte membrane, a separation membrane or a water-treatment membrane.

The resin composition may include antioxidants, heat stabilizers, lubricants, tackifiers, plasticizers, cross-linking agents, antifoaming agents, dispersants and other additives as needed.

The resin composition including an ion conducting polymer may be prepared as a shaped article in the form of fibers or films etc., by a random method including extruding followed by spinning, rolling or casting of the polymer, etc.

For example, an electrolyte membrane may be prepared by forming a resin composition including an ion conducting polymer. Specifically, it may be prepared by dissolving the polymer in N-methyl pyrrolidone (NMP), dimethylformamide, dimethylsulfoxide or dimethylacetamide, etc., functioning as a solvent, pouring the resulting solution into a glass plate, etc. acting as a plate, and drying the attached polymer to obtain a film in thickness of a number to several hundred μm, preferably 10 to 120 μm, more preferably, 50 to 100 μm followed by desorption from the plate. The suggested solvents are only for illustrative purpose and should not be construed as limiting the scope of the present invention. Conventional organic solvents can also be used as long as they are able to dissolve a polymer and can be evaporated under drying conditions. Specifically, the same organic solvent used during the preparation of the polymer can be used.

In an embodiment of the present invention, a membrane may be obtained by dissolving the prepared polymer in NMP, pouring the resulting solution into a silicon mold of a fixed size, and drying at 60 to 100° C., preferably 70 to 90° C., for 12 to 36 hours, preferably 18 to 30 hours. The resulting membrane may be converted into a polymer membrane in the form of a proton by washing the membrane with sulfuric acid and distilled water respectively.

Accordingly, a polymer substituted with sulfonic acid group or an alkali salt thereof can be used as a reactant in the method for preparing the polymer membrane according to the present invention, and the membrane may be conveniently converted to have a proton form by further washing with sulfuric acid. On the other hand, in the conventional method for preparing a polymer membrane, the hydrophilic monomers substituted with sulfonic acid group in the form of a sodium salt, which were protected with an alkyl or alkoxy group over two protection steps, were used to increase the degree of polymerization. Accordingly, such additional steps were needed. However, the preparation method of the present invention does not require a protection step, and thus, the synthesis process may be simplified, thereby significantly reducing the cost.

The shaped article according to the present invention, i.e., the polymer membrane, may be used as an electrolyte membrane or a separation membrane for batteries.

The term "an electrolyte membrane" used herein is a semi-permeable membrane which is also called a proton exchange membrane or a polymer electrolyte membrane (PEM). It only allows proton transfers, and is impermeable to oxygen or hydrogen gases etc. It is mostly introduced as a membrane-electrode assembly (MEA) of a proton exchange membrane fuel cell or a proton exchange membrane electrolyzer, and serves major function in reactant separation and proton transfers. The primary chemical features of those electrolyte membranes include ion conductivity, methanol permeability and thermal stability. Specifically, when used as a membrane-electrode assembly in fuel cells, the polymer membrane is saturated with water and becomes permeable to protons but impermeable to electrons.

In an embodiment of the method for preparing an electrolyte membrane, preferably, the electrolyte membrane may be prepared using the ion conducting polymer represented by Formula 4, wherein A is —(C=O)—; Ar is phenyl substituted with one sulfonic acid group or a sodium salt thereof; both a and b are 0; both $R_1$ and $R_1'$ are hydrogen atoms; $D_1$ and $D_2$ are respectively

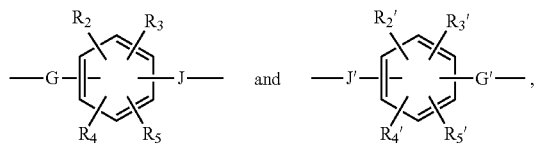

wherein $R_2$ to $R_5$ and $R_2'$ to $R_5'$ are all hydrogen atoms, both G and G' are —(C=O)—, and both J and J' are —O—; $D_1'$ and $D_2'$ are respectively the same as $D_1$ and $D_2$; both E and E' are —O—; Ar' and Ar''' are each independently unsubstituted aryls; both Ar'' and Ar'''' are

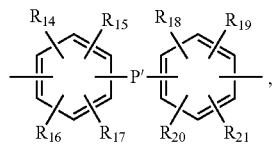

wherein $R_{14}$ to $R_{25}$ and $R_{22}'$ to $R_{25}'$ are all hydrogen atoms, and P' is a single bond; X and X' are each independently a halogen atom; and t=2.

Non-limiting preparation method for a membrane-electrode assembly may include; a first step for forming a catalyst layer by applying a catalyst slurry mixed with a catalyst, a hydrogen-ion conducting polymer, and a dispersion medium onto a releasing film followed by drying; a second step for orienting the catalyst layer formed on the releasing film onto both sides of an electrolyte membrane coated with hydrophilic solvents in such a way that the catalyst layer can face the electrolyte membrane, and stacking; and a third step for stacking the catalyst layer onto the stacked body, and transferring the layer onto the electrolyte membrane by applying hot pressing thereby forming a membrane-electrode assembly by removing the releasing film.

For example, in the present invention, the membrane-electron assembly (MEA) may be prepared by interposing the electrolyte membrane, according to the present invention, between a cathode and an anode under hot pressing. The heat-pressing pressure ranging from 0.5 to 10 MPa and the temperature ranging from 40 to 250° C. are preferred.

Catalysts, which may be used in the membrane-electrode assembly, are an alloy of Pt, Pt—Ru, Pt—Sn, Pt—Pd, etc. or Pt/C, Pt—Ru/C, etc. coated with fine carbon particles, and metal materials such as Pb, Ru, Bi, Sn and Mo can also be used by depositing onto Pt. However, the catalyst may be any substances as long as they are suitable for the hydrogen oxidation and oxygen reduction. Further, commercially available catalysts from Johnson Matthey and E-Tek, etc. can be used. The catalyst for electrodes, which is laminated onto both sides of the electrolyte membrane, serves as a cathode and anode, respectively, thus different quantities may be used depending on the reaction rate of both electrodes. A different type of catalyst may also be used.

The membrane-electrode assembly may be used for fuel batteries, and non-limiting examples of the fuel battery include a polymer electrolyte fuel cell (PEMFC), a direct methanol fuel cell (DMFC), etc.

The term "redox flow battery" of the present invention is a type of flow battery which is a rechargeable fuel battery, wherein an electrolyte containing electroactive species flows through an electrochemical cell which reversibly converts chemical energy directly into electricity, and is a reversible fuel battery, wherein all electroactive components are dissolved in the electrolyte. A gravity feed system may be used, but mostly, additional electrolytes are stored outside, generally, in a separate tank, and are pumped through a battery of reactive group. A flow battery can be quickly recharged by recovering the consumed materials in order to replace the electrolytic solution (in a similar manner as to supply the fuel tank of an internal combustion engine) as well as to re-energize it simultaneously. In such a redox flow battery, the energy of a battery is determined by the volume of an electrolyte, i.e., by the size of the tank, and the power is determined by the surface area of an electrode, i.e., by the size of the reactive group, and thus the energy is completely decoupled from the power source just like any other fuel batteries.

In such a redox flow battery, unlike other batteries, the electroactive species are present as ions in the state of an aqueous solution rather than in a solid state, and have an energy storage mechanism via oxidation/reduction reactions of ions respectively from cathode and anode. The battery is discharged when an electrical load is connected to an external circuit containing an electrical load, thereby making the current flow out of the cell. Conversely, the cell is charged when the cell is connected with an external power source, thereby making the current flow into the cell. Generally, the catholyte solution (catholyte) is charged when two electrons in a redox couple are oxidized into a higher electovalence, and is recharged when reduced into a lower electovalence. The opposite phenomenon occurs in the anolyte solution.

Most redox flow batteries consist of two separate electrolytes. One electrolyte stores electroactive materials from the negative electrode reaction, and the other is used in the positive electrode reaction. In particular, to avoid confusion, the negative electrode is defined as an anode and the positive electrode is defined as a cathode during discharging, whereas the terms are used during charging. A fresh or used electrolyte may be circulated and stored in a single storage tank. Or the concentrations of the electroactive material may be controlled individually. The ion exchange membrane may be used as a separation membrane to prevent the mixing of electroactive materials, because it may lead to chemical power failures.

The term "separation membrane" used herein refers to an ion exchange membrane which is introduced to prevent the mixing of electroactive materials in a redox flow battery. In both sides of electrodes, which are separated by the separation membrane, only common counter ion carriers may pass through the separation membrane. For example, in a bromine-polysulfide system, wherein $Na_2S_2$ is converted to $Na_2S_4$ from the anode and $Br_2$ is converted to $2Br$ from the cathode, the excess Na+ ions from the anode are transferred to the cathode to maintain the electrical neutral condition. Similarly, in a vanadium system, wherein $V^{2+}$ is oxidized to $V^{3+}$ from the anode and $V^{5+}$ is reduced to $V^{4+}$ from the cathode, the hydronium ions ($H_3O+$) from the anode is transferred to the cathode via proton conducting membrane.

In an actual redox flow battery, electrolyte reactions in the cathode and the anode differ from each other, generating a pressure difference between the cathode and the anode due to an electrolytic solution flow phenomenon. Accordingly, it is preferred to have a separation membrane having an excellent physical strength so that it may not be destroyed by a pressure difference.

The separation membrane of the present invention may be prepared from a partially branched block copolymer, which is an ion conducting polymer of the present invention, by a known random forming method.

For example, it may be prepared by dissolving the polymer in N-methyl pyrrolidone (NMP), dimethylformamide, dimethylsulfoxide or dimethylacetamide, etc. functioning as a solvent, pouring the resulting solution into a glass plate, etc., acting as a plate, and drying the attached polymer to obtain a film in thickness of a number to several hundred μm, preferably 10 to 120 μm, more preferably, 50 to 100 μm followed by desorption from the plate. The suggested solvents are only for illustrative purpose and should not be construed as limiting the scope of the present invention. Conventional organic solvents can be used as long as they are able to dissolve a polymer and can be evaporated under drying conditions. Specifically, the same organic solvent used during the preparation of the polymer, may be used.

Or the separation membrane can be prepared as a reinforced composite membrane by impregnating the ion conducting polymer into a nano-web support to reduce the rate of dimensional change thereby improving mid-/long term durability simultaneously. The "nano-web support" consists of an aggregation of nanofibers, which is connected irregularly and discontinuously in 3-dimensions, thereby providing a large number of uniformly distributed pores. Thus, it contains a large number of uniformly distributed pores.

Preferably, a nano-web support without any electrochemical activity can be selected. Non-limiting examples of the materials consisting the nano-web support include; a polyimide, polymethylpentene, polyester, polyacrylonitrile, polyvinyl amides, polyethylene, polypropylene, polyvinyl fluoride, polyvinylidene difluoride, nylon, polybenzoxazole, polyethylene terephthalate, polytetrafluoroethylene, polyarylene ether sulfone, polyether ether ketone or a combination thereof. That is, the nano-web supporter itself is not electrochemically active, but may exhibit an ion exchange membrane characteristic via impregnated ion conducting polymer thereof. Thus, the separation membrane prepared as a reinforced composite membrane may have improved heat resistance, chemical resistance and mechanical properties than that of the separation membrane prepared from nearly ion conducting polymers.

A process of filling the ion conducting polymers into the nano-web support may be performed using a dipping or impregnating process, but is not limited thereto. Various methods known in the art including laminating process, spray process, screen printing process, doctor blade process, etc., may be used.

In an embodiment, a membrane may be obtained by dissolving the prepared polymer in NMP, pouring the resulting solution into a silicon mold of a fixed size, and drying at 60 to 100° C., preferably 70 to 90° C., for 12 to 36 hours, preferably 18 to 30 hours. In addition, the polymer was impregnated into the polyimide nano-web supporter to obtain a reinforced composite membrane. The membrane prepared in the form of a sodium salt may be converted into a polymer membrane in the form of a proton by washing the resulting membrane with sulfuric acid and distilled water respectively.

Preferably, the separation membrane may have a thickness ranging from 10 μm to 1000 μm. When the thickness of the separation membrane is less than 10 μm, its mechanical strength and formation stability may deteriorate. In contrast, when the thickness is greater than 1000 μm, it may result in the increase in the loss of resistance.

The redox flow battery according to the present invention is a redox flow battery consisting of a cathode, a catholyte, a separation membrane according to the present invention, an anode and an anolyte.

The redox flow battery will be explained with reference to FIG. 8 as an exemplary embodiment. The battery consists of; a cell housing having a predetermined size (251), ion exchange membrane installed across the center of the housing cell (211), cathode electrode (221) and anode electrode (222) located at both left/right sides respectively, which are separated by the ion exchange membrane inside of cell housing, catholyte inlet (231) and catholyte outlet (232) which perform the inflow and outflow of the electrolytes used in the cathode electrode, wherein said electrolytes are formed on the upper/lower parts of cell housing located on the same side as the cathode electrode, anolyte inlet (241) and anolyte outlet (242) which perform the inflow and outflow of electrolytes used in the negative electrode, wherein the electrolytes are formed on the upper/lower parts of cell housing located on the same side as the negative electrode.

Preferably, the redox flow battery according to the present invention, may be an all-vanadium redox battery, which uses a V(IV)/V(V) redox couple as the catholyte and a V(II)/V(III) redox couple as the anolyte; a vanadium redox battery, which uses a halogen redox couple as the catholyte and a V(II)/V(III) redox couple as the anolyte; a polysulfide bromide redox battery, which uses a halogen redox couple as the catholyte and a sulfide redox couple as the anolyte; or a zinc-bromine (Zn—Br) redox battery, which uses a halogen redox couple as the catholyte and a zinc redox couple as the anolyte, but is not limited thereto.

Advantageous Effects

The ion conducting polymer in the form of partially branched block copolymer according to the present invention can prepare a polymer membrane having improved conductivity and superior physical properties such as tensile strength, elongation at break, etc., while having the same or similar ion-exchange capacity (IEC), percentage water absorption and/or degree of dimensional change compared to conventional ion conducting polymers in the form of linear block copolymers. Due to its improved physical properties, the polymer membrane can be used in a membrane-electrode assembly for a fuel battery. Further, the redox flow battery consisting of the membrane as a separation membrane exhibits outstanding cell performance and maintains a high discharge charge capacity retention rate even when repeatedly charged/discharged several times.

BEST MODE FOR CARRYING OUT INVENTION

Figure 1A:
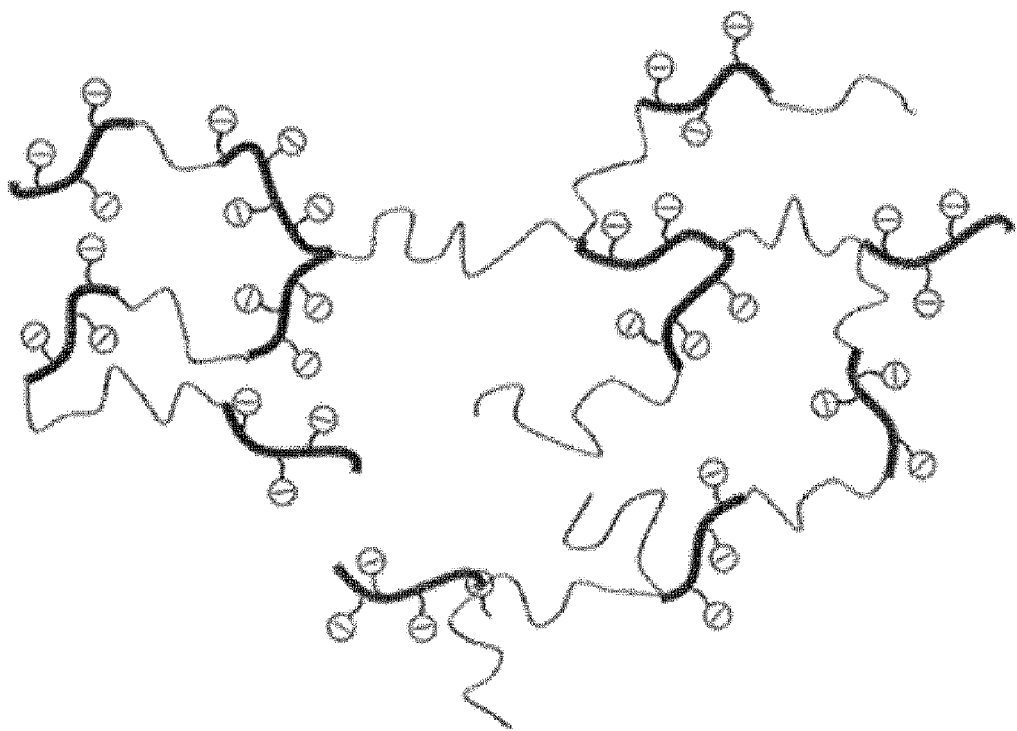
FIGS. 1A and 1B are schematic diagrams illustrating the partially branched block copolymer (A) and the conventional linear block copolymer (B) according to the present invention. (–) labeled on bold red lines represent the hydrophilic block polymers (hydrophilic first block polymer), black solid lines represent the hydrophobic block polymers (hydrophobic second or third polymers), and black solid lines connected to at least 2 blocks (hydrophilic or hydrophobic) represent branch-coupled hydrophobic block polymers, which are hydrophobic second block polymer.
Figure 1B:
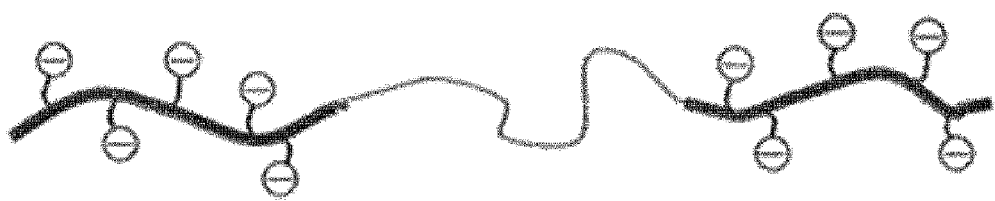

Hereinbelow, the present invention will be described in detail with accompanying exemplary embodiments. The exemplary embodiments used herein are for the purpose of describing particular inventions only and are not intended to be limiting the scope of the present invention.

EXAMPLE 1

Ion Conducting Polymer Using Various Hydrophobic Block Copolymer 1.1 Synthesis of Hydrophilic Monomer (M1)

After completely dissolving 100 g (389 mmol) of 2,5-dichlorobenzophenone in 150 mL of concentrated sulfuric acid by adding it thereto, a drop of 150 mL of fuming sulfuric acid was added dropwisely using a dropping funnel. The resultant temperature was raised to 80° C. and the resultant was stirred for 16 hours. The temperature was dropped to room temperature and a large amount of ice-cold water (about 2 L) was poured into the resultant and added with NaCl. The resulting white powder was filtered, dissolved in about 2 L of de-ionized water, added with 10% of NaOH until its pH reached to 6 or 7, and added with 150 g of NaCl to obtain a precipitate. The obtained precipitate was completely dried, filtered, added with about 1 L of dimethylsulfoxide (DMSO) and stirred. After filtering the resulting solution, it was evaporated to remove the filtered solvent. The remaining crude product was re-crystallized twice and dried under vacuum for 24 hours. From the above process, 84 g of compound M1 (sodium 3'-(2,5-dichlorobenzophenone)sulfonate (2,5-SDCBP)) shown below was obtained.

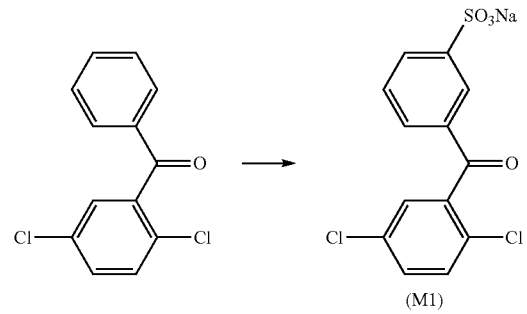

1.2 Synthesis of Hydrophobic Block Polymer (01-1, 02 and 03)

10 g (39.957 mmol) of bis(4-hydroxyphenyl)sulfone (BHPS), 12.130 g (42.240 mmol) of bis(4-chlorophenyl)sulfone (DCPS), and 6.617 g (47.948 mmol) of $K_2CO_3$ were dissolved in 120 mL of dimethylacetamide (DMAc) and 40 mL of toluene. The resultant was stirred for 3 hours at 145° C., and the resultant temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 19.8 g of compound 01 (Mn=8.2K) shown below was obtained.

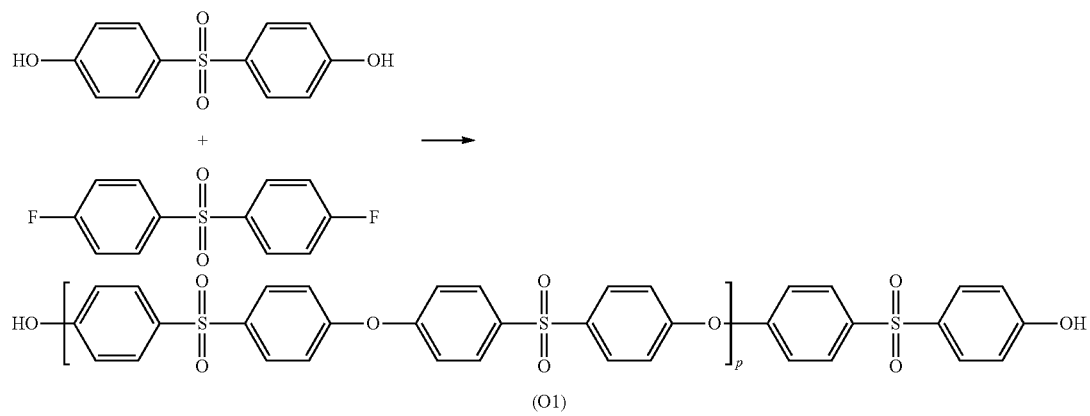

(O1)

15 g of the obtained compound 01 was dissolved with 1.76 g (7.5 mmol) of 4-chloro-4'-fluorobenzophenone (CFBP) and 0.31 g (2.25 mmol) of $K_2CO_3$ in 100 mL of dimethylacetamide (DMAc) and 30 mL of toluene. The resultant was stirred for 3 hours at 145° C., and the resultant temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 14.3 g of compound 01-1 (Mn=8.6K) shown below was obtained.

(O1-1)

10 g (46.681 mmol) of 4,4'-dihydroxybenzophenone (DHBP), 12.356 g (49.204 mmol) of 4,4'-dichlorobenzophenone (DCBP) and 7.73 g (56.017 mmol) of $K_2CO_3$ were dissolved in 120 mL of dimethylacetamide (DMAc) and 40 mL of toluene. The resultant was stirred for 3 hours at 145° C. and, the resultant temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 20.2 g of compound 02 (Mn=8.7K) shown below was obtained.

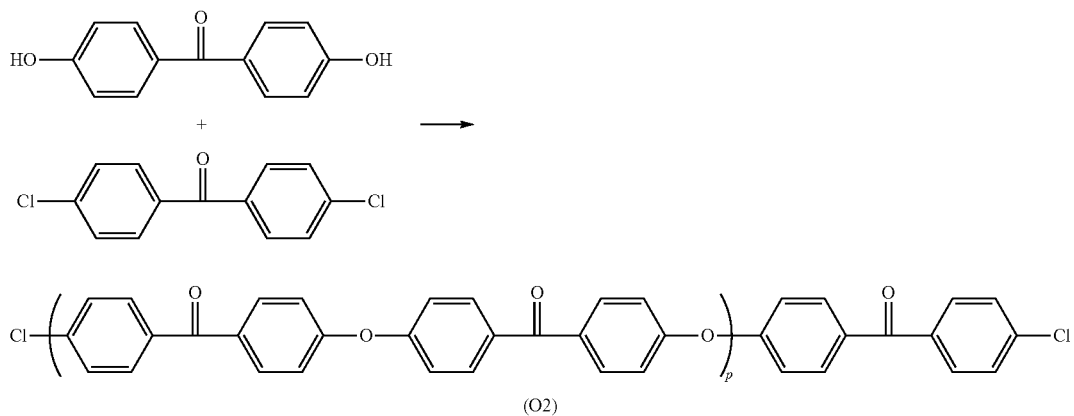

(O2)

5 g (45.409 mmol) of 4,4'-dihydroxybenzophenonen (DHBP), 11.8 g (47.06 mmol) of 4,4'-dichlorobenzophenone (DCBP) and 7.52 g (54.491 mmol) of $K_2CO_3$ were dissolved in 120 mL of dimethylacetamide (DMAc) and 40 mL of toluene. The resultant was stirred for 3 hours at 145° C., and the resultant temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 14.3 g of compound 03 (Mn=8.6K) shown below was obtained.

1.4 Synthesis of Partially Branched Block Copolymer and Preparation of Polymer Membrane Using the Same (P1 to P3)

4 g of 2,5-SDCBP (M1), a hydrophilic monomer, 1.2 g of the hydrophobic block polymer 01-1 and 0.13 g of the hydrophobic block polymer 01-2, capable of branch coupling synthesized in Examples 1 to 3 respectively, were dissolved in 20 mL of DMAc. 0.17 g of $NiBr_2$, 1.5 g of triphenylphosphine and 3.2 g of zinc were dissolved in 10 mL of DMAc and the resultant was stirred for 30 minutes at 80° C. and added with a solution containing the hydrophilic monomers (M1), hydrophobic block polymer (01-1) and hydrophobic block polymer, capable of branch coupling (01-2). The resulting solution was stirred for additional 8

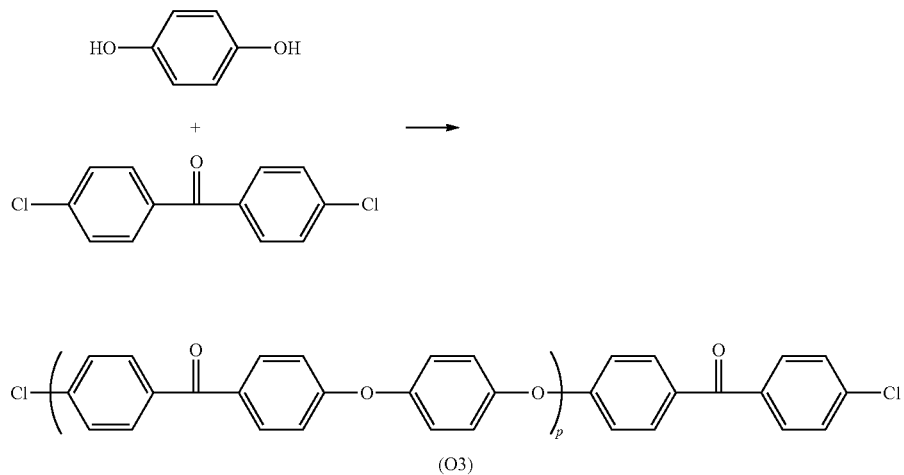

(O3)

1.3 Synthesis of Hydrophobic Polymer Capable of Branch Coupling (01-2)

3 g of compound 01, synthesized in Example 1.2, was dissolved with 0.4 g (1.48 mmol) of 4'-fluoro-2,5-dichlorobenzophenone (2,5-FDCBP) and 0.061 g (0.45 mmol) of $K_2CO_3$ in 20 mL of dimethylacetamide (DMAc) and 10 mL of toluene. The resultant was stirred for 3 hours at 145° C., and the resulting temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 3 g of compound 01-2 (Mn=8.7K) shown below was obtained.

hours while maintaining its temperature. After cooling the temperature to room temperature, the resulting solution was poured into an ethanol-HCl mixed solution (9:1, v/v) to remove zinc and washed with ethanol and distilled water at high temperatures respectively. The synthesized block copolymer was dried under vacuum at 80° C. to obtain 3.4 g of a polymer in the form of a sodium salt.

0.5 g of the synthesized polymer was dissolved in 5 mL of N-methyl-2-pyrrolidone (NMP), poured into a 8 cm×8 cm sized silicone mold and dried for 24 hours at 80° C. to obtain a membrane. The thus-prepared membrane was immersed into 1.5 M of an aqueous sulfuric acid solution and distilled water respectively for 24 hours to obtain a proton-type polymer membrane. The resultant is shown by Formula (P1) below.

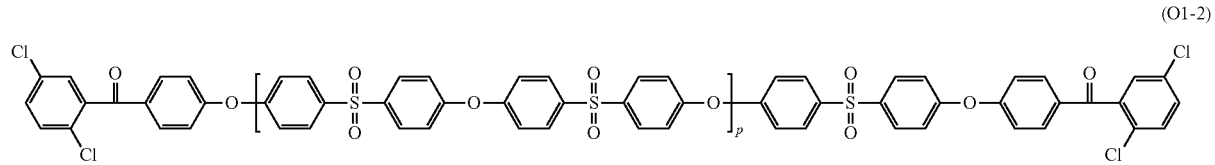

(O1-2)

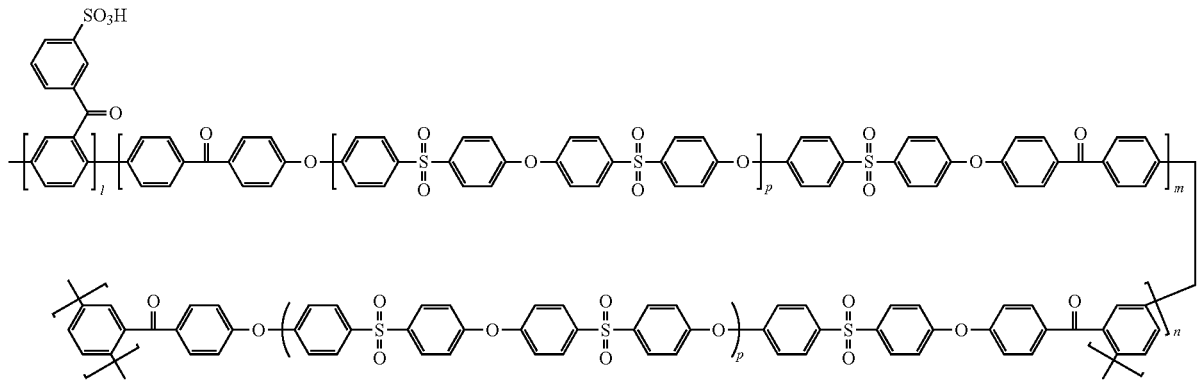

(P1)

The hydrophobic block copolymer 01 was replaced with the hydrophobic block copolymer 02 to obtain a polymer in the form of a sodium salt and a proton-type polymer membrane using the same method described above. The resulting polymer membrane is shown by Formula P2 below.

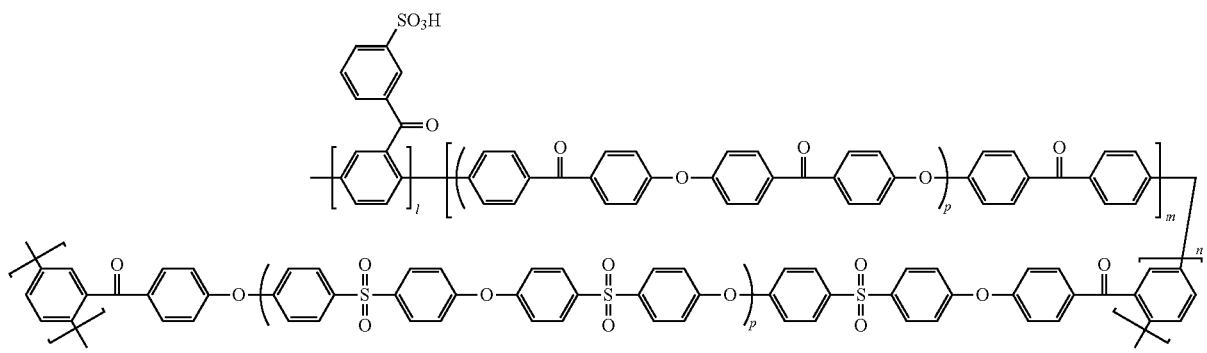

(P2)

Further, the hydrophobic block copolymer 01 was replaced with the hydrophobic block copolymer 03 to obtain a polymer in the form of a sodium salt and a proton-type polymer membrane using the same method described above. The resulting polymer membrane is shown by Formula P3 below.

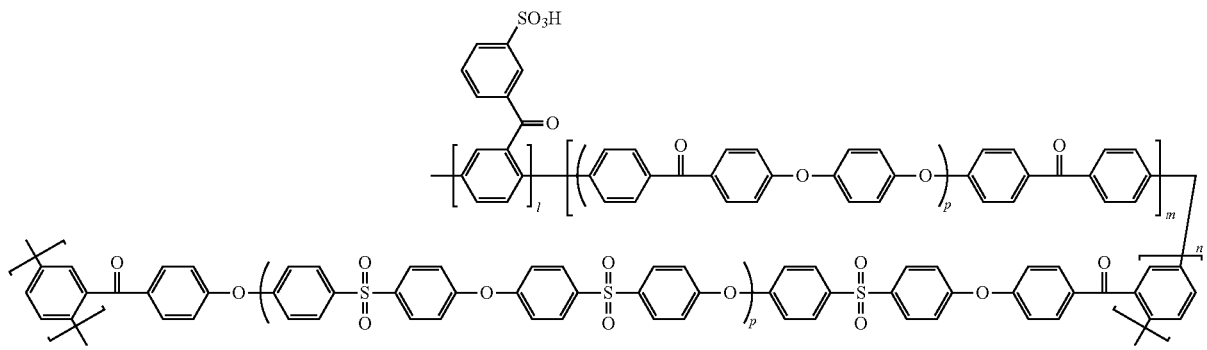

(P3)

COMPARATIVE EXAMPLE 1

Synthesis of a Linear Block Copolymer and Preparation of Polymer Membrane Using the Same 4 g of 2,5-SDCBP (M1), a hydrophilic monomer, and 1.34 g of the hydrophobic block polymer each synthesized in Example 1 were dissolved in 20 mL of DMAc. 0.17 g of $NiBr_2$, 1.5 g triphenylphosphine and 3.2 g of zinc were dissolved in 10 mL of DMAc and the resultant was stirred for 30 minutes at 80° C. and added with a solution containing the hydrophilic monomers (M1) and hydrophobic block polymer (01-01). The resulting solution was stirred for additional 8 hours while maintaining its temperature. After cooling the temperature to room temperature, the resulting solution was poured into an ethanol-HCl mixed solution (9:1, v/v) to remove zinc and washed with ethanol and distilled water at high temperatures respectively. The synthesized block copolymer was dried under vacuum at 80° C. to obtain 3.3 g of a polymer in the form of a sodium salt.

0.5 g of the synthesized polymer was dissolved in 5 mL of N-methyl-2pyrrolidone (NMP), poured into a 8 cm×8 cm sized silicone mold and dried for 24 hours at 80° C. to obtain a membrane. The thus-prepared membrane was immersed into 1.5 M of an aqueous sulfuric acid solution and distilled water for 24 hours respectively to obtain a proton-type polymer membrane. The resultant is shown by Formula (C1) below.

of in-phase using four prove conductivity cell. Prior to measurement, a constant temperature was maintained for 30 minutes in a constant temperature and humidity chamber. The conductivity was calculated by the following equation.

$$\text{Conductivity } (S/cm) = \frac{l}{R \times S}$$

In particular, I is the distance between electrodes, R is the impedance of a membrane, and S is surface area representing proton movements.

Next, the dimensional change was measured. A membrane prepared for dimensional change was immersed into distilled water for 24 hours to measure a wet membrane volume (Vwet). The wet membrane was dried under vacuum at 120° C. for 24 hours to measure a dry volume (Vdry). The dimensional change was calculated by substituting the measured numerical values into the following equation.

$$\text{Dimensional change } (\%) = \frac{V_{wet} - V_{dry}}{V_{dry}} \times 100$$

Finally, water uptake (WU) was measured. The mass of wet membrane (Wwet) and the mass of dry membrane (Wdry) were measured and substituted into the following equation to calculate the water uptake.

(C1)

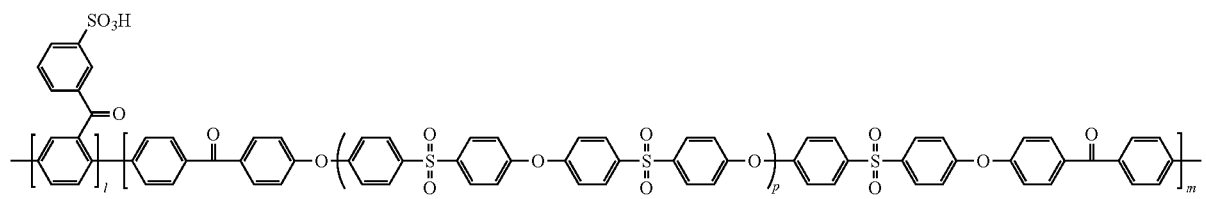

EXPERIMENTAL EXAMPLE 1

Comparison of Characteristics of Linear Block Copolymer and Partially Branch-Coupled Copolymers Physical properties of polymers, which were prepared by the methods described in Examples and Comparative Example, were measured and compared.

First, a proton conductivity was measured by AC Impedance analyzer (Solatron 1280, Impedance/gain phase analyzer) at 25° C. and under 100% relative humidity at 80° C. It was measured in the range of 0.1 to 20 kHz in the direction $$WU\ (\%) = \frac{W_{wet} - W_{dry}}{W_{dry}} \times 100$$

The molecular weight was converted from the measured intrinsic viscosity. In order to measure the intrinsic viscosity, the viscosity of a solution prepared at a concentration 0.5 g/dl was measured in a constant temperature chamber at 25° C. by dissolving the polymer, which was prepared for intrinsic viscosity, in NMP via a Ubbelohde viscometer.

The thus obtained results are shown in Table 1 below.

TABLE 1

| Polymer | IEC | WU (%) | Dimensional change | Conductivity (S/cm) (RH 100%) 25° C. | 80° C. | Young's modulus (Mpa) | Tensile strength (Mpa) | Elongation at break (%) |
|---|---|---|---|---|---|---|---|---|
| Comparative polymer C1 | 1.89 | 65 | 69 | 0.105 | 0.256 | 384.2 ± 40.0 | 25.0 ± 1.3 | 42.6 ± 8.7 |

TABLE 1-continued

| Polymer | IEC | WU (%) | Dimensional change | Conductivity (S/cm) (RH 100%) 25° C. | Conductivity (S/cm) (RH 100%) 80° C. | Young's modulus (Mpa) | Tensile strength (Mpa) | Elongation at break (%) |
|---|---|---|---|---|---|---|---|---|
| P1 | 1.85 | 68 | 72 | 0.131 | 0.287 | 492.3 ± 16.2 | 39.3 ± 2.1 | 72.7 ± 6.3 |
| P2 | 1.85 | 66 | 73 | 0.122 | 0.278 | 517.8 ± 38.4 | 41.7 ± 1.3 | 68.6 ± 8.2 |
| P3 | 1.88 | 71 | 72 | 0.124 | 0.272 | 446.4 ± 32.6 | 34.2 ± 1.5 | 82.5 ± 3.8 |

EXAMPLE 2

Ion Conducting Polymer Using Various Ratios of Hydrophobic Block Copolymers 2.1 Synthesis of Hydrophilic Monomer (M1)

The hydrophilic monomer M1 was synthesized in the same manner as described in Example 1.1.

2.2 Synthesis of Hydrophobic Block Polymer (Q1-1)

20 g (107.4 mmol) of 4,4-dihydroxyphenyl, 28.9 g (100.5 mmol) of bis(4-chlorophenyl)sulfone (DCPS) and 17.8 g (128.9 mmol) of $K_2CO_3$ were dissolved in 250 mL of dimethylacetamide (DMAc) and 120 mL of toluene. The resultant was stirred for 3 hours at 145° C., and the resultant temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 42.8 g of compound Q1 (Mn=5.6K) shown below was obtained.

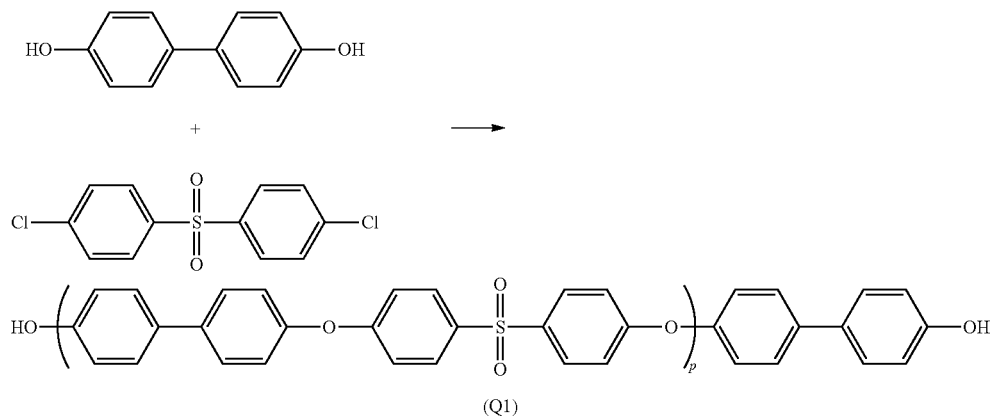

(Q1)

10 g (1.79 mmol) of the obtained compound Q1 was dissolved with 1.05 g (4.48 mmol) of 4-chloro-4'-fluorobenzophenone (CFBP) and 0.30 g (2.15 mmol) of $K_2CO_3$ in 100 mL of dimethylacetamide (DMAc) and 50 mL of toluene. The resultant was stirred for 3 hours at 145° C., and the resultant temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 10.4 g of compound Q1-1 shown below was obtained.

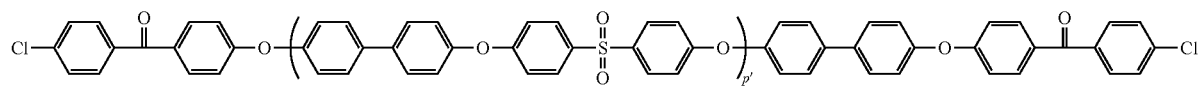

(Q1-1)

2.3 Synthesis of Hydrophobic Block Polymer Capable of Branch Coupling (Q1-2)

10 g of compound Q1, synthesized in Example 2.2, was dissolved with 1.21 g (4.48 mmol) of 2,5-dichloro-4'-fluorobenzophenone (2,5-DCFCBP) and 0.30 g (2.15 mmol) of $K_2CO_3$ in 100 mL of dimethylacetamide (DMAc) and 50 mL of toluene. The resultant was stirred for 3 hours at 145° C., and the resulting temperature was raised to 165° C. to completely remove toluene by evaporation. The resulting product was stirred for additional 24 hours while maintaining the temperature, and filtered after cooled down to room temperature, and the resulting filtrate was poured into methanol to obtain a precipitate. The thus-obtained precipitate was washed with methanol at high temperature, filtered and dried in a vacuum oven. From the above process, 10.3 g of compound Q1-2 shown below was obtained.

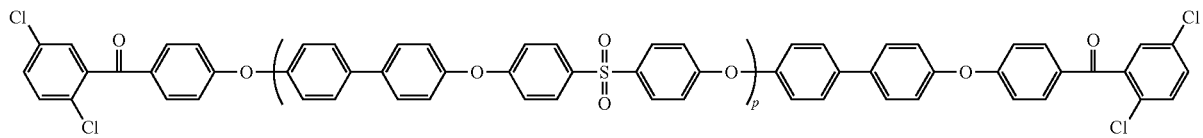

(Q1-2)

2.4 Synthesis of Partially Branched Block Copolymer Containing Different Ratio of Hydrophobic Blocks and Preparation of Polymer Membrane Using the Same (R1 to R3)

respectively. The synthesized block copolymer was dried under vacuum at 80° C. to obtain 3.4 g of a polymer (R2) in the form of a sodium salt. Mn=89.6 kg/mol, Mw=242.8 kg/mol.

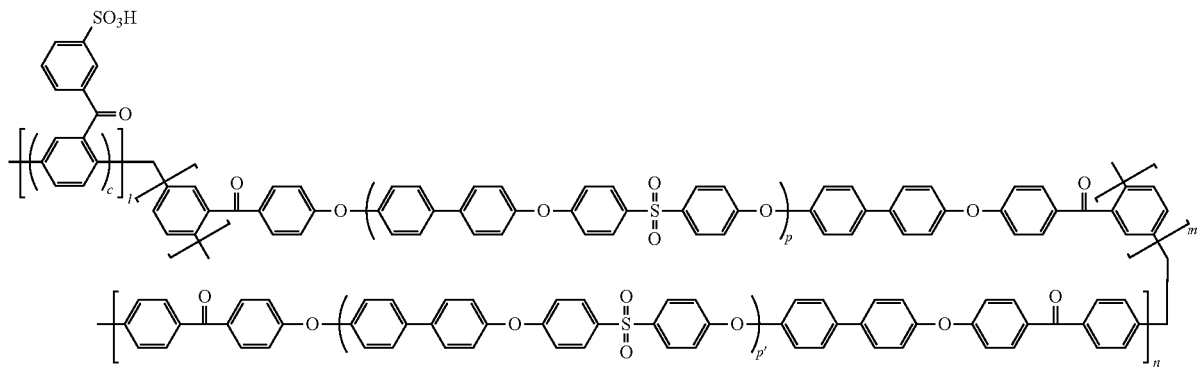

(R1, R2, R3)

<Synthesis of R1>

0.17 g of $NiBr_2$, 1.5 g of triphenylphosphine and 3.2 g of zinc were dissolved in 10 mL of DMAc. The resultant was stirred for 30 minutes at 80° C. and added with a solution, wherein 4 g 2.5-SDCBP, a hydrophilic monomer M1, 1.2 g of hydrophobic block polymer (Q1-1) and 0.13 g of hydrophobic block polymer, capable of branch coupling (Q1-2), prepared in Examples of 2.1 to 2.3 respectively were dissolved in 20 ml of DMAc. The resulting solution was stirred for additional 8 hours while maintaining its temperature. After cooling the temperature to room temperature, the resulting solution was poured into an ethanol-HCl mixed solution (9:1, v/v) to remove zinc and washed with ethanol and distilled water at high temperatures respectively. The synthesized block copolymer was dried under vacuum at 80° C. to obtain 3.2 g of a polymer (R1) in the form of a sodium salt. Mn=77.8 kg/mol, Mw=168.4 kg/mol.

Figure 4:
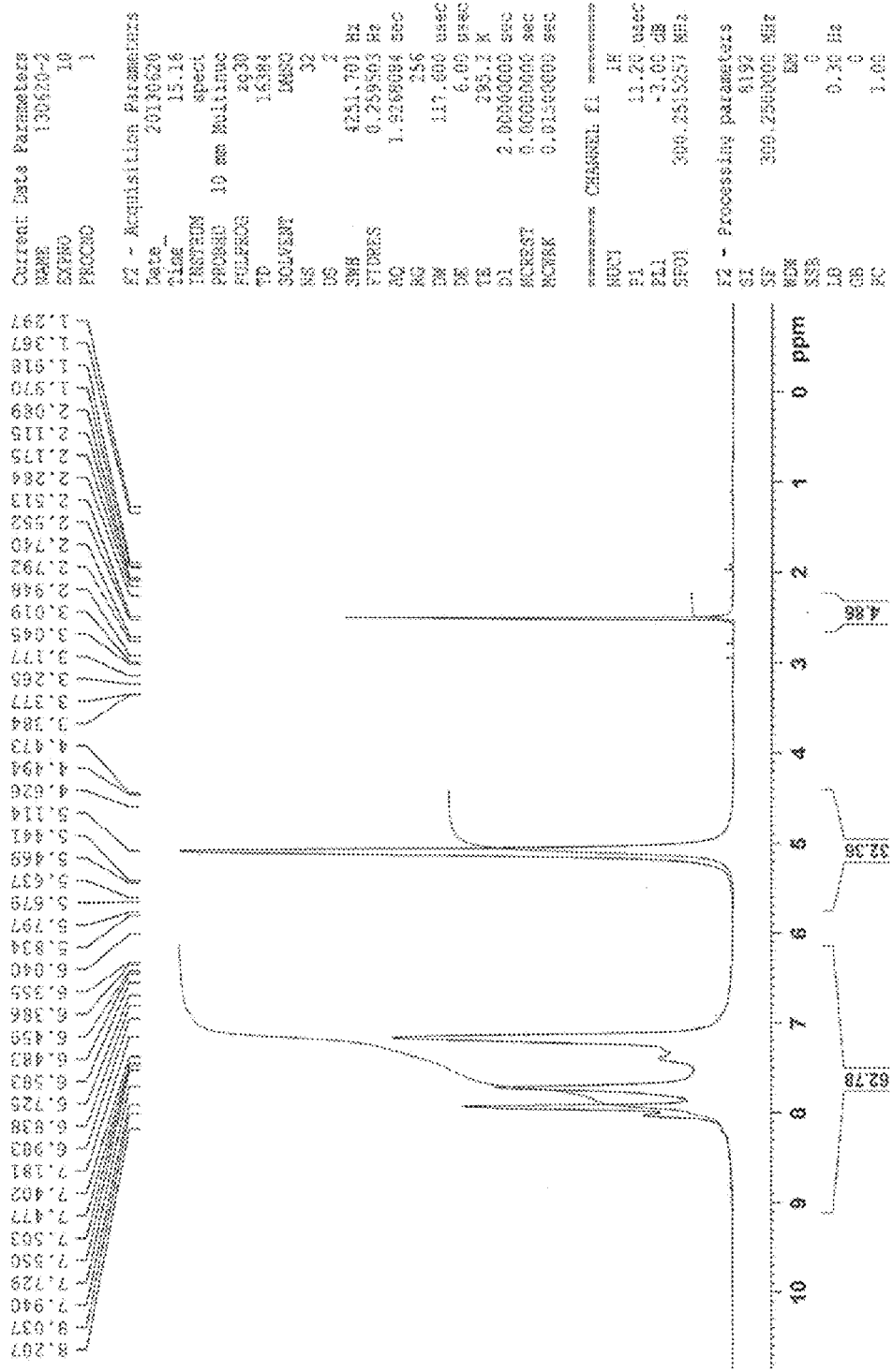
FIG. 4 shows a 1H NMR spectrum of the partially branched block copolymer R1 according to an embodiment of the present invention.

The synthesized R1 polymer was identified via 1H NMR, and the result is shown in FIG. 4.

<Synthesis of R2>

Figure 5:
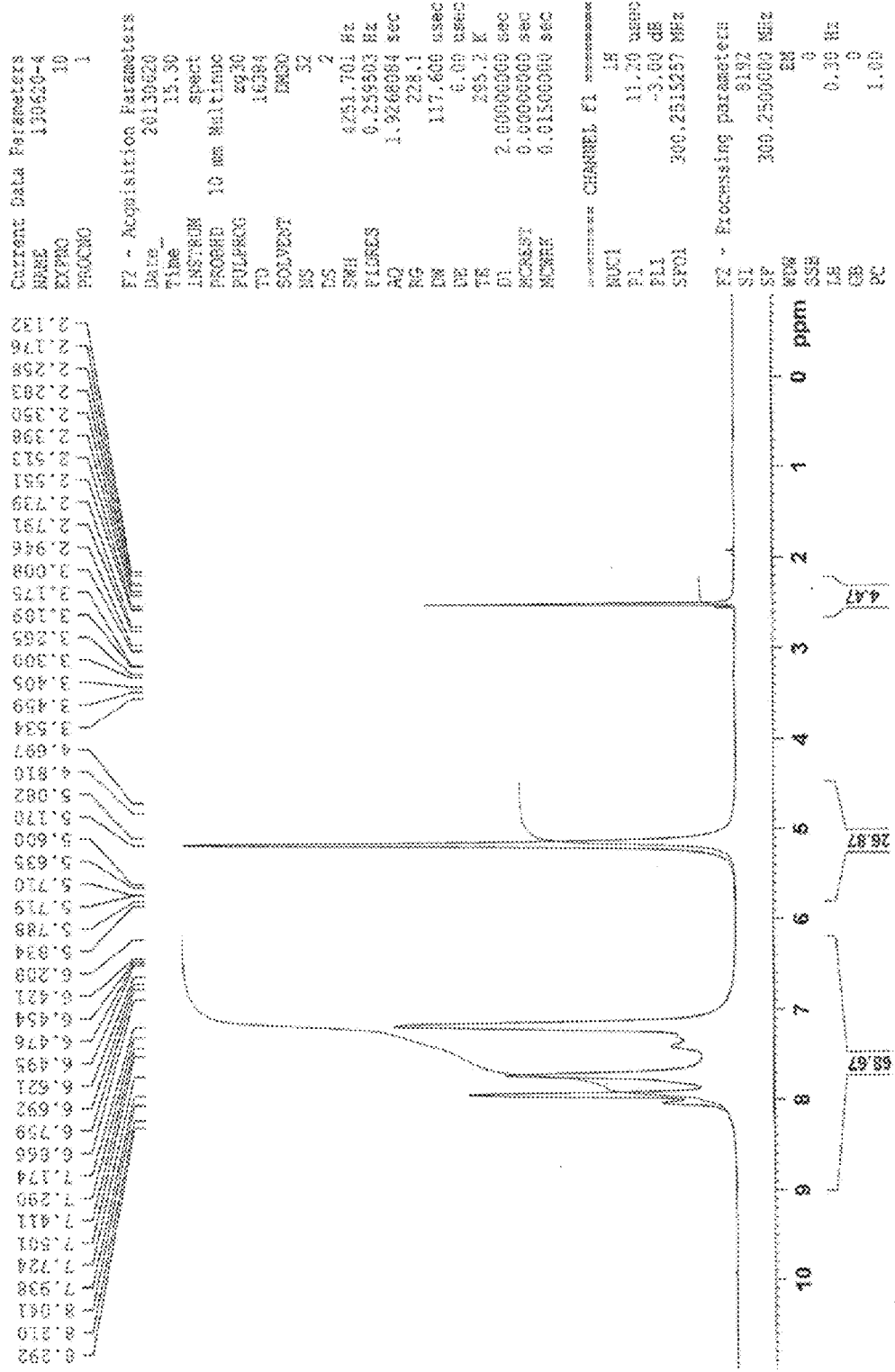
FIG. 5 shows a 1H NMR spectrum of the partially branched block copolymer R2 according to an embodiment of the present invention.

0.17 g of $NiBr_2$, 1.5 g of triphenylphosphine and 3.2 g of zinc were dissolved in 10 mL of DMAc. The resultant was stirred for 30 minutes at 80° C. and added with a solution, wherein 4 g 2.5-SDCBP, a hydrophilic monomer M1, 0.94 g of hydrophobic block polymer (Q1-1) and 0.39 g of hydrophobic block polymer, capable of branch coupling (Q1-2), prepared in Examples of 2.1., 2.2. and 2.3., respectively were dissolved in 20 ml of DMAc. The resulting solution was stirred for additional 8 hours while maintaining its temperature. After cooling the temperature to room temperature, the resulting solution was poured into an ethanol-HCl mixed solution (9:1, v/v) to remove zinc and washed with ethanol and distilled water at high temperatures The synthesized R2 polymer was identified via 1H NMR, and the result is shown in FIG. 5.

<Synthesis of R3>

0.17 g of $NiBr_2$, 1.5 g of triphenylphosphine and 3.2 g of zinc were dissolved in 10 mL of DMAc. The resultant was stirred for 30 minutes at 80° C. and added with a solution, wherein 4 g 2.5-SDCBP, a hydrophilic monomer M1, hydrophobic block polymer (Q1-1) and 0.39 g of hydrophobic block polymer, capable of branch coupling (Q1-2), prepared in Examples of 2.1., 2.2. and 2.3. respectively were dissolved in 20 ml of DMAc. The resulting solution was stirred for additional 8 hours while maintaining its temperature. After cooling the temperature to room temperature, the resulting solution was poured into an ethanol-HCl mixed solution (9:1, v/v) to remove zinc and washed with ethanol and distilled water at high temperatures respectively. The synthesized block copolymer was dried under vacuum at 80° C. to obtain 3.2 g of a polymer (R3) in the form of a sodium salt. Mn=74.6 kg/mol, Mw=172.4 kg/mol.

Figure 6:
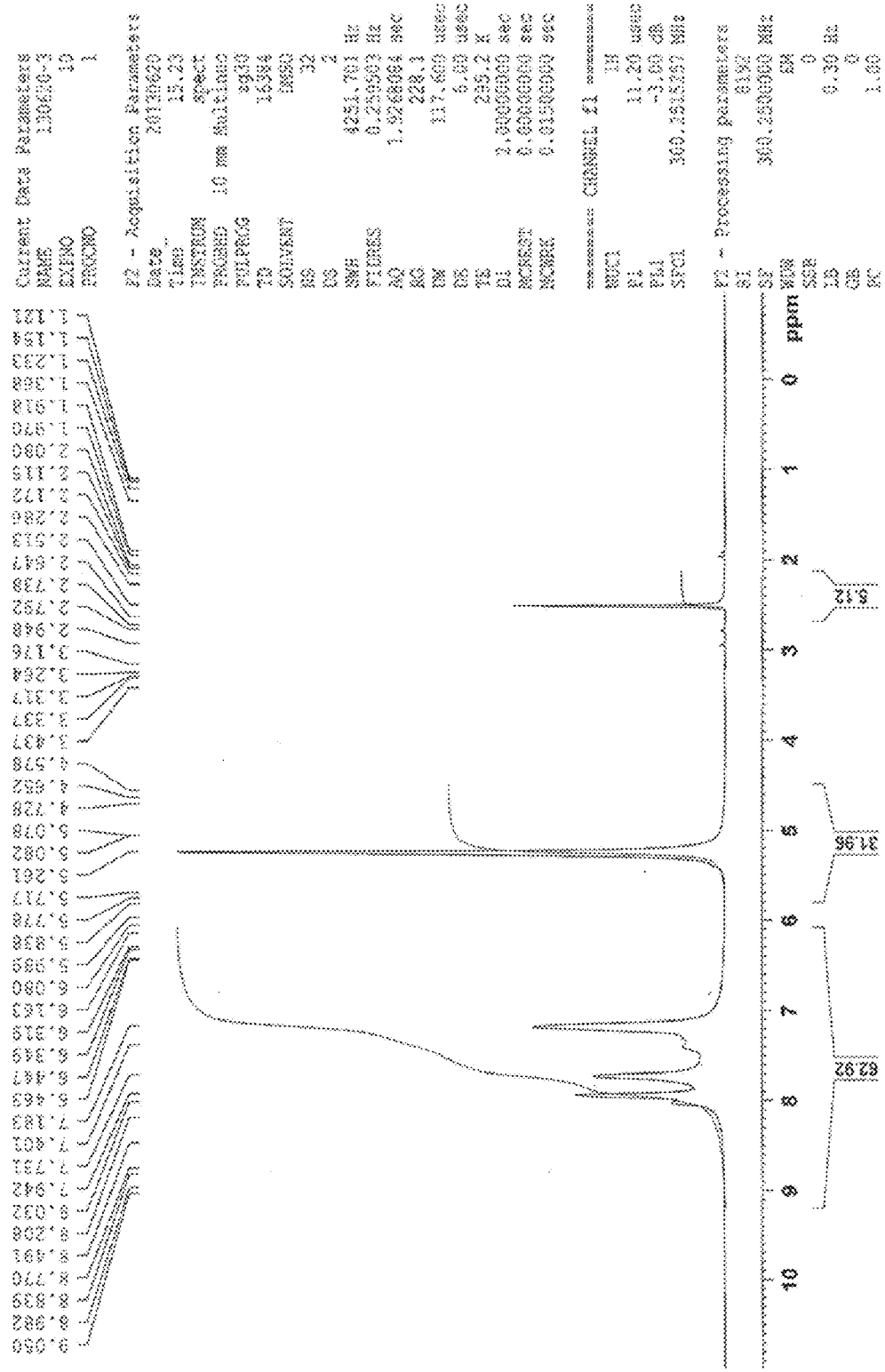
FIG. 6 shows a 1H NMR spectrum of the partially branched block copolymer R3 according to an embodiment of the present invention.

The synthesized R3 polymer was identified via 1H NMR, and the result is shown in FIG. 6

<Synthesis of a Polymer Membrane>

0.5 g of synthesized polymers R1 to R3 respectively were dissolved in 5 mL of N-methyl-2-pyrrolidone (NMP), poured into a 8 cm×8 cm sized silicone mold and dried for 24 hours at 80° C. to obtain a membrane. The thus-prepared membrane was immersed into 1.5 M of an aqueous sulfuric acid solution and distilled water for 24 hours respectively to obtain proton-type polymer membranes. The resultants are shown by Formula (R1 to R3).

COMPARATIVE EXAMPLE 2

Synthesis of Linear Block Copolymer and Preparation of Polymer Membrane Using the Same (comparative polymer: L1)

[Chemical structure of comparative polymer L1 with SO₃H group]

0.17 g of NiBr$_2$, 1.5 g of triphenylphosphine and 3.2 g of zinc were dissolved in 10 mL of DMAc. The resultant was stirred for 30 minutes at 80° C. and added with a solution, wherein 4 g 2.5-SDCBP, a hydrophilic monomer M1, 0.94 g of hydrophobic block polymer (Q1-1), prepared in Examples 2.1 to 2.2 respectively, were dissolved in 20 ml of DMAc. The resulting solution was stirred for additional 8 hours while maintaining its temperature. After cooling the temperature to room temperature, the resulting solution was poured into an ethanol-HCl mixed solution (9:1, v/v) to remove zinc and washed with ethanol and distilled water at high temperatures respectively. The synthesized block copolymer was dried under vacuum at 80° C. to obtain 3.3 g of a polymer in the form of a sodium salt. Mn=54.6 kg/mol, Mw=112.4 kg/mol.

0.5 g of the polymer synthesized above was dissolved in 5 mL of N-methyl-2pyrrolidone (NMP), poured into a 8 cm×8 cm sized silicone mold and dried for 24 hours at 80° C. to obtain a membrane. The thus-prepared membrane was immersed into 1.5 M of an aqueous sulfuric acid solution and distilled water for 24 hours respectively to obtain a proton-type polymer membrane. The resultant is shown by Formula (L1).

Figure 7:
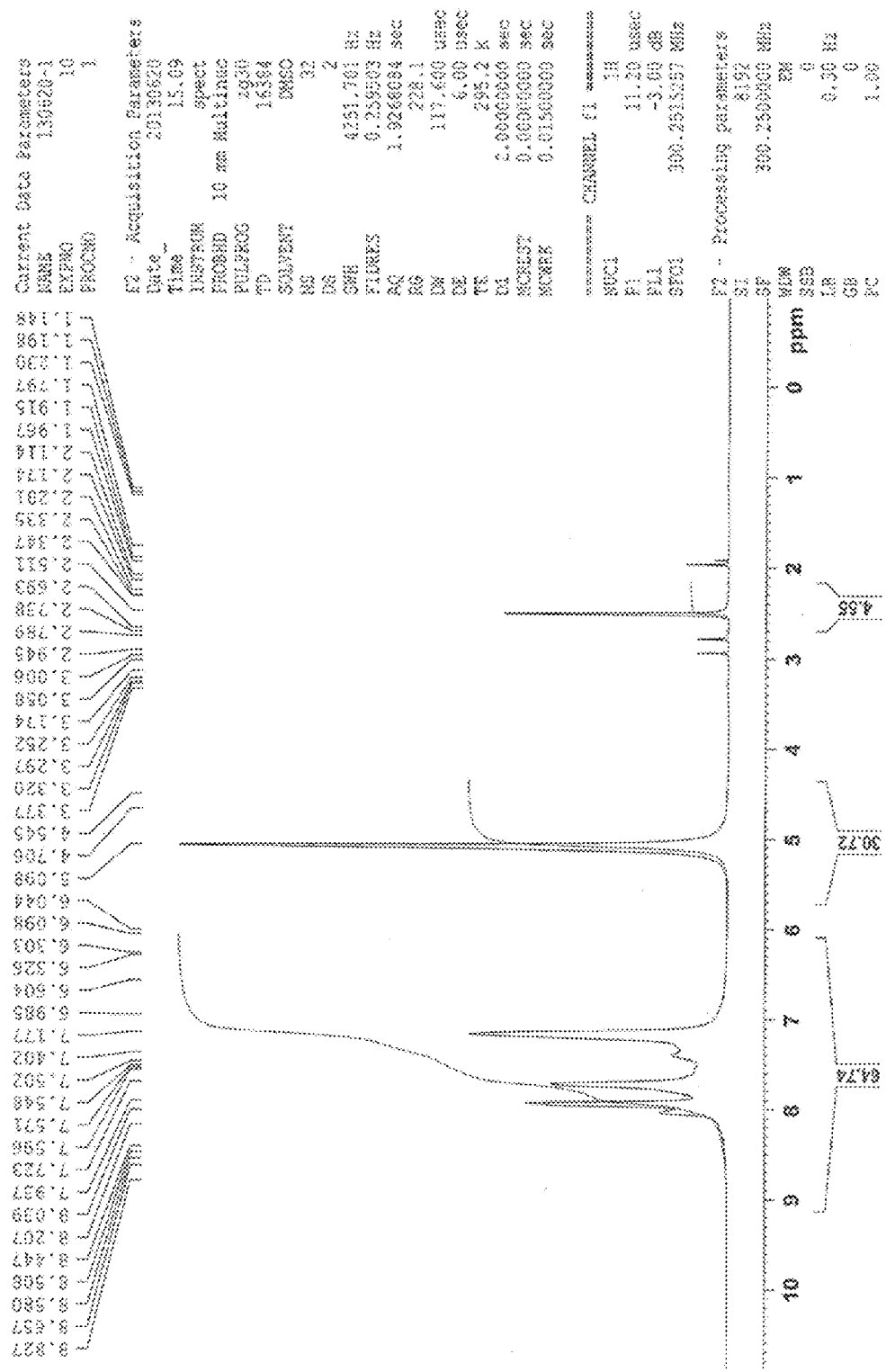
FIG. 7 shows a 1H NMR spectrum of synthesized linear block copolymer L1 as a comparative example.

The synthesized polymer L1 was identified via 1H NMR, and the result is shown in FIG. 7.

EXPERIMENTAL EXAMPLE 2

Comparison of Characteristics of Linear Block Copolymer (L1) and Partially Branch-Coupled Copolymers (R1-R3)

Physical properties of polymer membranes, which were prepared according to the Example 2 and the Comparative Example 2 by the method described in Experimental Example 1, were measured and compared. The results are shown in Table 2.

PREPARATION EXAMPLE 1

Preparing of a Membrane-Electrode Assembly for Fuel Batteries Using a Polymer Membrane Prepared from a Linear Block Copolymer (L1) and Partially Coupled Block Copolymer Branches (R1-R3)

Figure 2:
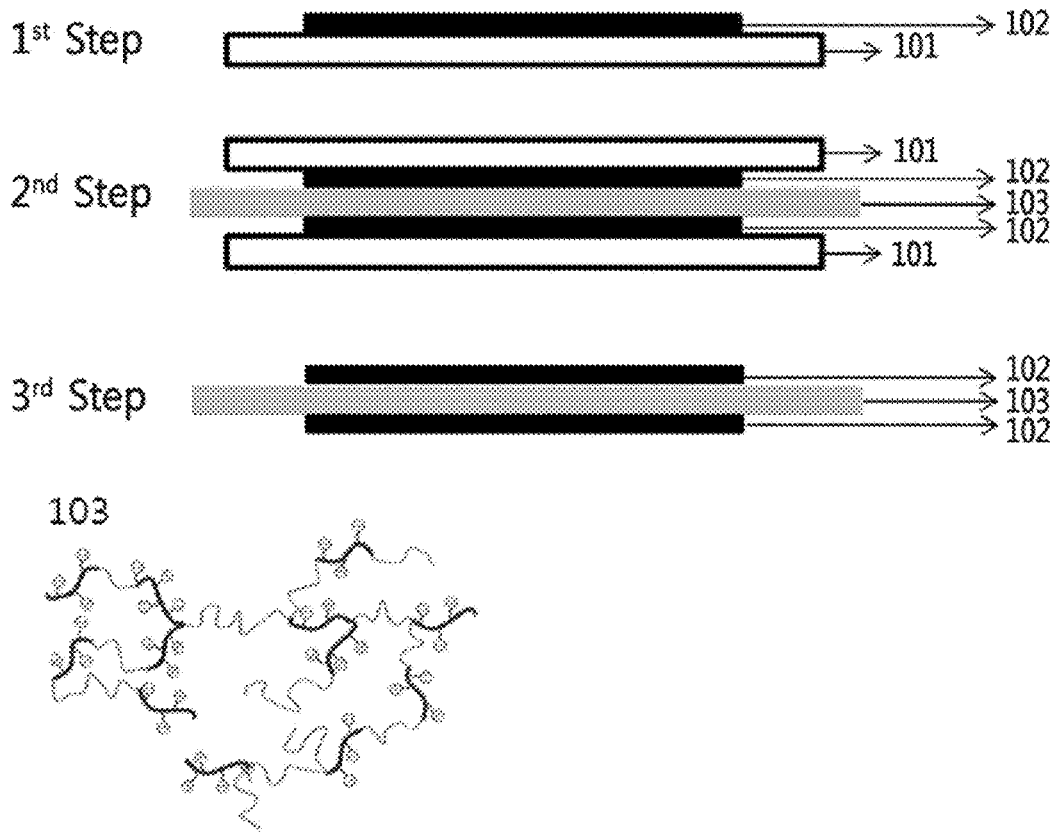
FIG. 2 is schematic diagrams illustrating the method of preparing membrane-electrode assembly using ion conducting polymer membrane according to an embodiment of the present invention
Figure 2:
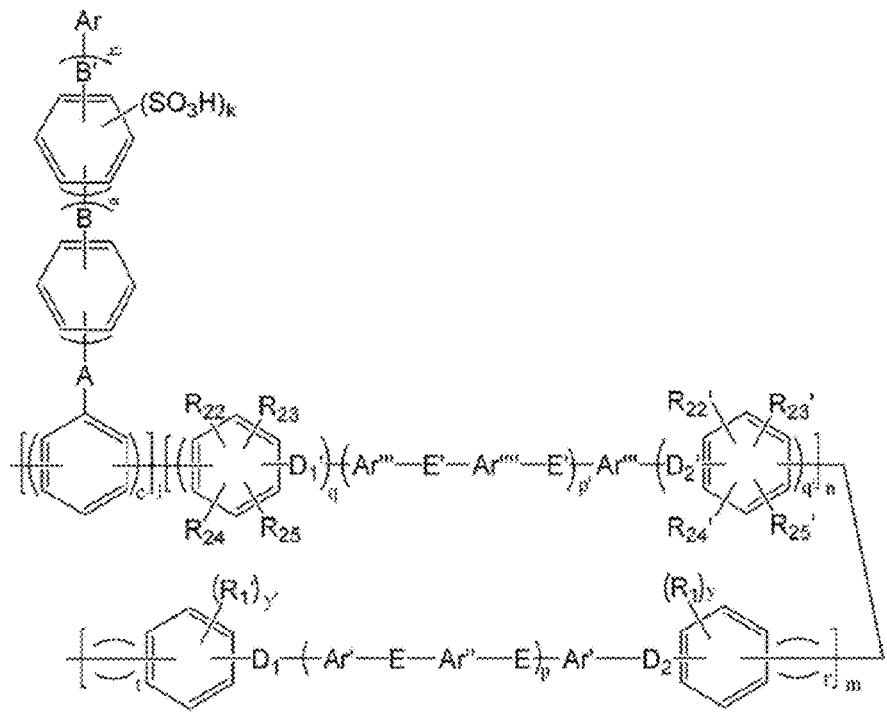

A method of preparing a membrane-electrode assembly for fuel batteries using polymer membrane (R1, R2, R3 and L1, which is a comparative polymer) prepared in the Example 2 and the Comparative Example are schematically shown in FIG. 2.

First, a catalyst slurry mixed with a catalyst, the hydrogen ion conducting polymer and a dispersion medium was applied onto a releasing film, and dried to form a catalyst layer. Next, the catalyst layer formed on the releasing film was laminated onto both sides of an electrolyte membrane applied with hydrophilic solvents in such a way that the catalyst layer is oriented towards the electrolyte membrane. Lastly, the catalyst layer was laminated with a laminate, transferred into the electrolyte membrane by applying hot pressing to prepare a membrane-electrode assembly by removing the releasing film.

6 cm×6 cm sized electrolyte membranes prepared in Example 2 and Comparative Example 2 respectively and the catalyst slurry for the preparation of an electrode were prepared. In particular, the method for preparing the catalyst slurry is as follows; 170 mg of 40% by weight Pt/C catalyst, which is commercially available from E-tek (USA), 600 mg of 5% by weight Nafion dispersion solution (DuPont Inc., USA), 870 mg of water, and 460 mg of isopropyl alcohol were mixed and stirred ultrasonically for 30 minutes. The catalyst and Nafion were uniformly mixed to obtain the catalyst slurry. The catalyst slurry obtained according to the method was coated onto a polyimide film using a doctor

TABLE 2

| Polymer | IEC | WU (%) | Dimensional change | Conductivity (S/cm) (RH 100%) 25° C. | Conductivity (S/cm) (RH 100%) 80° C. | Young's modulus (Mpa) | Tensile strength (Mpa) | Elongation at break (%) |
|---|---|---|---|---|---|---|---|---|
| Comparative polymer L1 | 1.89 | 65 | 69 | 0.105 | 0.256 | 384.2 ± 40.0 | 25.0 ± 1.3 | 42.6 ± 8.7 |
| R1 | 1.92 | 68 | 73 | 0.133 | 0.289 | 492.3 ± 16.2 | 40.3 ± 1.1 | 77.8 ± 5.4 |
| R2 | 1.83 | 62 | 69 | 0.120 | 0.266 | 542.8 ± 43.4 | 43.4 ± 1.0 | 43.6 ± 7.4 |
| R3 | 1.53 | 53 | 60 | 0.107 | 0.245 | 627.0 ± 4.4 | 46.2 ± 2.8 | 55.5 ± 4.4 | blade. In particular, the catalyst slurry was prepared as such that the thickness of the catalyst layer in the wet state after coating was 200 µm. The catalyst slurry was dried in an oven under a nitrogen atmosphere at 120° C. for 10 hours.

Thereafter, the coated catalyst layer on the polyimide film was cut into a size of 25 cm² and laminated onto the electrolyte membrane (about 60 µm), synthesized in advance in Example 2. The electrolyte membrane was first synthesized and formed into a film, and further prepared by applying 1,2-propanediol (boiling point 188° C.) solution with a brushing method. The amount of the hydrophilic solvent applied was 200 mg solvent/cm³ electrolyte membrane. The laminate was constructed so as to protect the polymer electrolyte membrane, wherein one side of the polyimide film coated with the catalyst layer was arranged so that each catalyst layer is facing the electrolyte membrane containing 1,2-propanediol on both sides, and the polyimide film was additionally adhered on the outside of the electrolyte membrane.

Finally, the laminate was placed between the silicone rubbers and further inserted between the stainless steel plate. The resultant was compressed at 120° C. for 3 minutes with 2 MPa pressure using a flatbed press (Carver Inc., USA) to prepare a membrane-electrode assembly (MEA). The polyimide film was removed from the prepared membrane-electrode assembly, and the transfer rate was calculated from the weight of the catalyst layer remaining thereon. The calculated transfer rate was 100%.

EXPERIMENTAL EXAMPLE 3

Performance of a Fuel Battery Containing Membrane-Electrode Assembly Using the Polymer Membrane Prepared from Partially Branched Block Copolymer In order to verify the uses of the ion conducting polymer according to the present invention, which is the partially branched block copolymer, as a membrane-electrode assembly for fuel batteries, the performance of the fuel battery, wherein the membrane-electrode assembly prepared using the polymer was introduced, was confirmed by measuring a current-voltage curve via FCT-TS300 (Fuel Cell Technologies Inc., USA).

Figure 3:
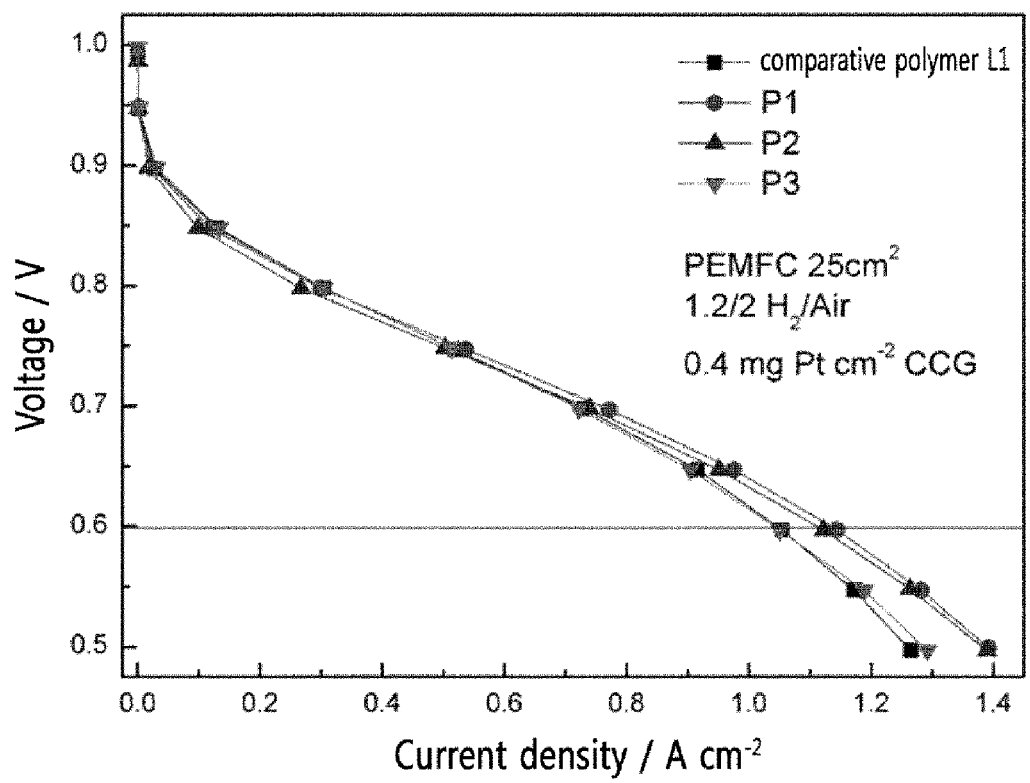
FIG. 3 shows current-voltage curves illustrating the comparative result of various performances on fuel batteries including the membrane-electrode assembly, which was prepared using ion conducting polymer membrane according to an embodiment of the present invention.

Specifically, to activate the fuel cell, the measurement was taken at 0.6 V for 48 hours and the steam capacity was 100 RH %. During a unit cell operation, the flow rate was adjusted to 1.2:2 respectively for the anode fuel, which was hydrogen and the cathode fuel, which was the air. The current-voltage curve was measured from 1.0 V to 0.5 V, at 50 mV-intervals for 25 seconds. The current density was represented on the X-axis, and the voltage was represented on the Y-axis in the current-voltage curve. It is a typical fuel battery performance evaluation method showing the changes in density as the voltage applied to the measurement device changes, and the results are shown in FIG. 3. As shown in FIG. 3, it was confirmed that the fuel battery, wherein the polymer membrane prepared using the partially branch-coupled block copolymer (R1 to R3) of the present invention was introduced, shows relatively higher current densities in all areas of cell voltages, compared to that of the fuel battery using a similar linear block copolymer (comparative polymer L1) thereof. Thus, it can be concluded that, when a partially branch-coupled block copolymer was formed, prepared into a polymer membrane, and introduced as a membrane-electrode assembly, it may provide greater performances than that of the membrane-electrode assembly using the linear block copolymer having the same monomer compositions.

EXPERIMENTAL EXAMPLE 4

Figure 8:
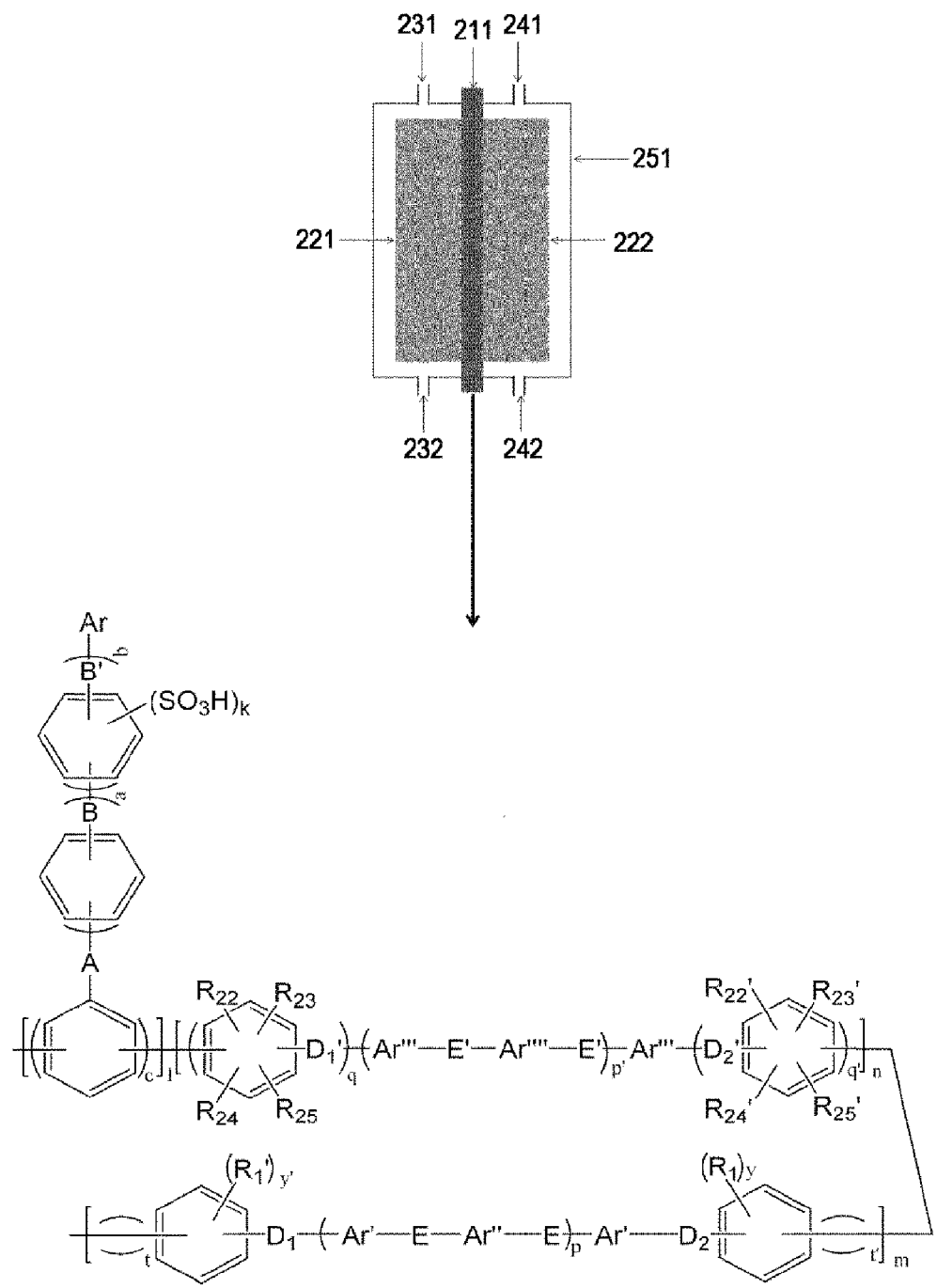
FIG. 8 is a schematic diagram illustrating the composition of a general redox flow battery.
Figure 9:
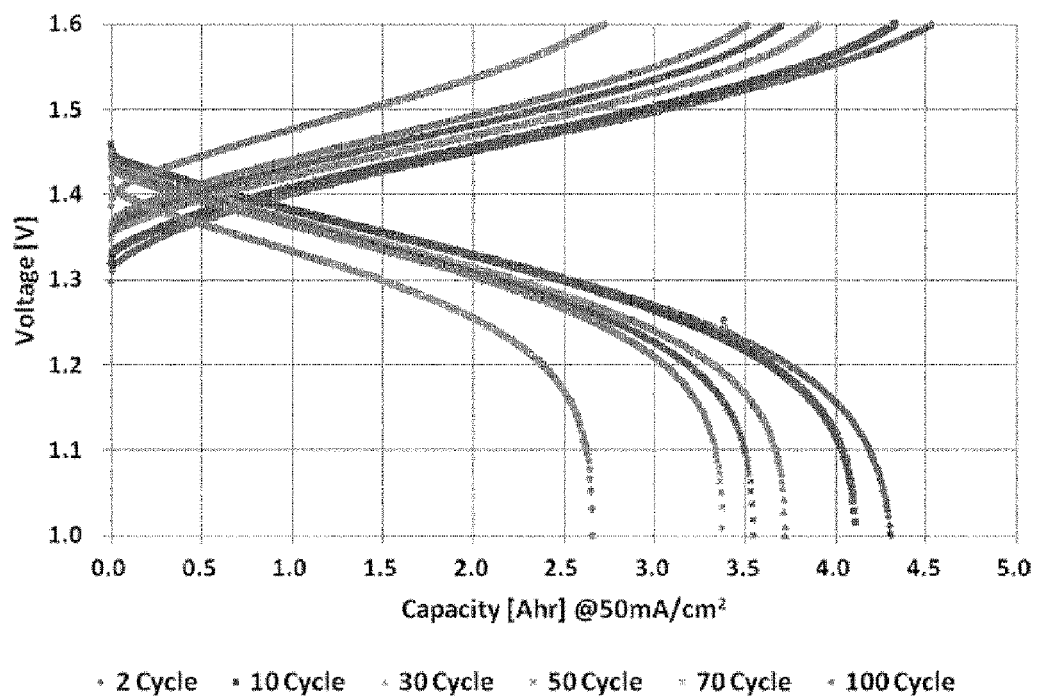
FIG. 9 shows a graph illustrating the performances of a single cell consisting of R1 polymer ion exchange membrane in an embodiment of the present invention. The variations of discharge charge capacity based on the number of repetitions of charging/discharging are illustrated.
Figure 10:
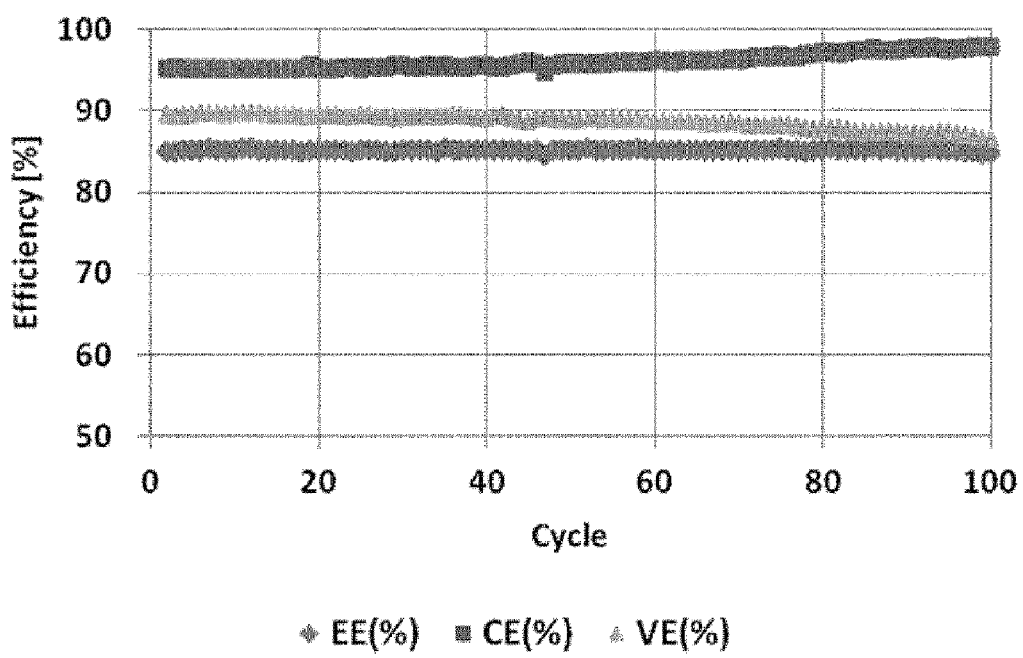
FIG. 10 shows a graph illustrating the variations of the energy efficiency, Coulomb efficiency and voltage efficiency based on the number of repetitions of charging/discharging of sing cell consisting of R1 polymer ion exchange membrane according to an embodiment of the present invention.
Figure 11:
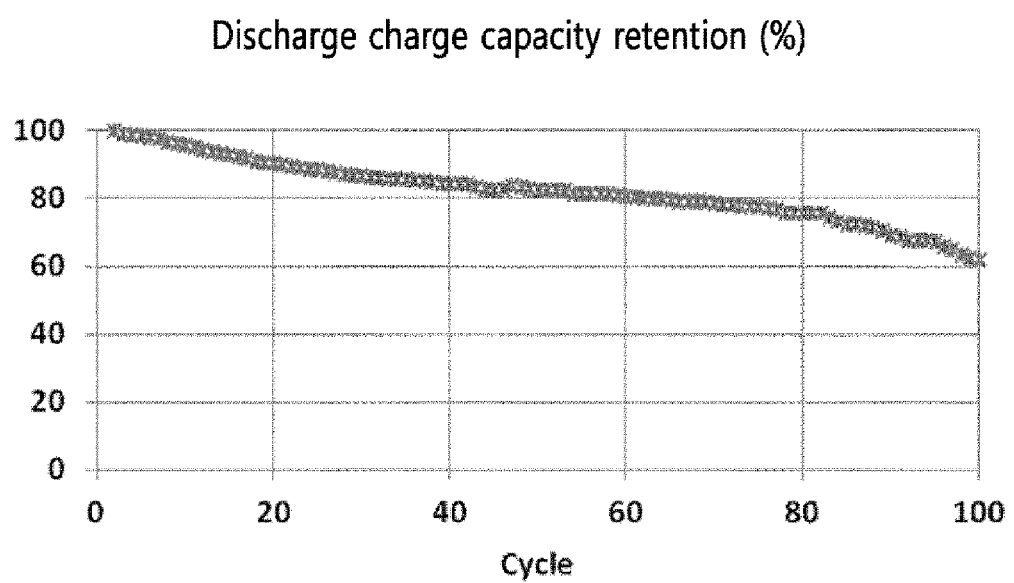
FIG. 11 shows a graph illustrating the discharge charge capacity retention rate based on the number of repetitions of charging/discharging of sing cell consisting of R1 polymer ion exchange membrane according to an embodiment of the present invention.

Composition of a Redox Flow Battery Comprising a Polymer Membrane Prepared from the Partially Block Copolymer (R1) and Performance Evaluation Thereof The membrane containing R1 polymer among the 55 µm thick proton-type ion exchange membranes containing R1 to R3 prepared according to Example 2, was cut into a size of 70 mm×50 mm and installed (11) into a single cell prepared as shown in FIG. 8. The cell's charging/discharging test and the efficiency were measured, and the results are shown in FIGS. 9 to 11.

Specifically, a 5 mm thick carbon felt treated with heat and acid was used respectively as materials for the cathode and anode. The acrylic material was used for an electrode frame, and bakelite from Hexion Inc. was used for an end plate. V(IV)/V(V) oxidation-reduction pairs (redox couple) were used for the catholyte, and V(II)/V(III) oxidation-reduction pair was used for the anolyte.

Further, in order to improve the dimensional stability as an ion conducting membrane, a single cell (R1+nano-web) consisting of the reinforced composite membrane prepared by impregnating R1 into a nano-web supporter made with polyimide was prepared under the same conditions. As a comparative Example, a single cell consisting of Nafion, which is used widely as an ion conductor in conventional redox flow batteries, introduced as an ion exchange membrane, was prepared in the same manner.

Figure 12:
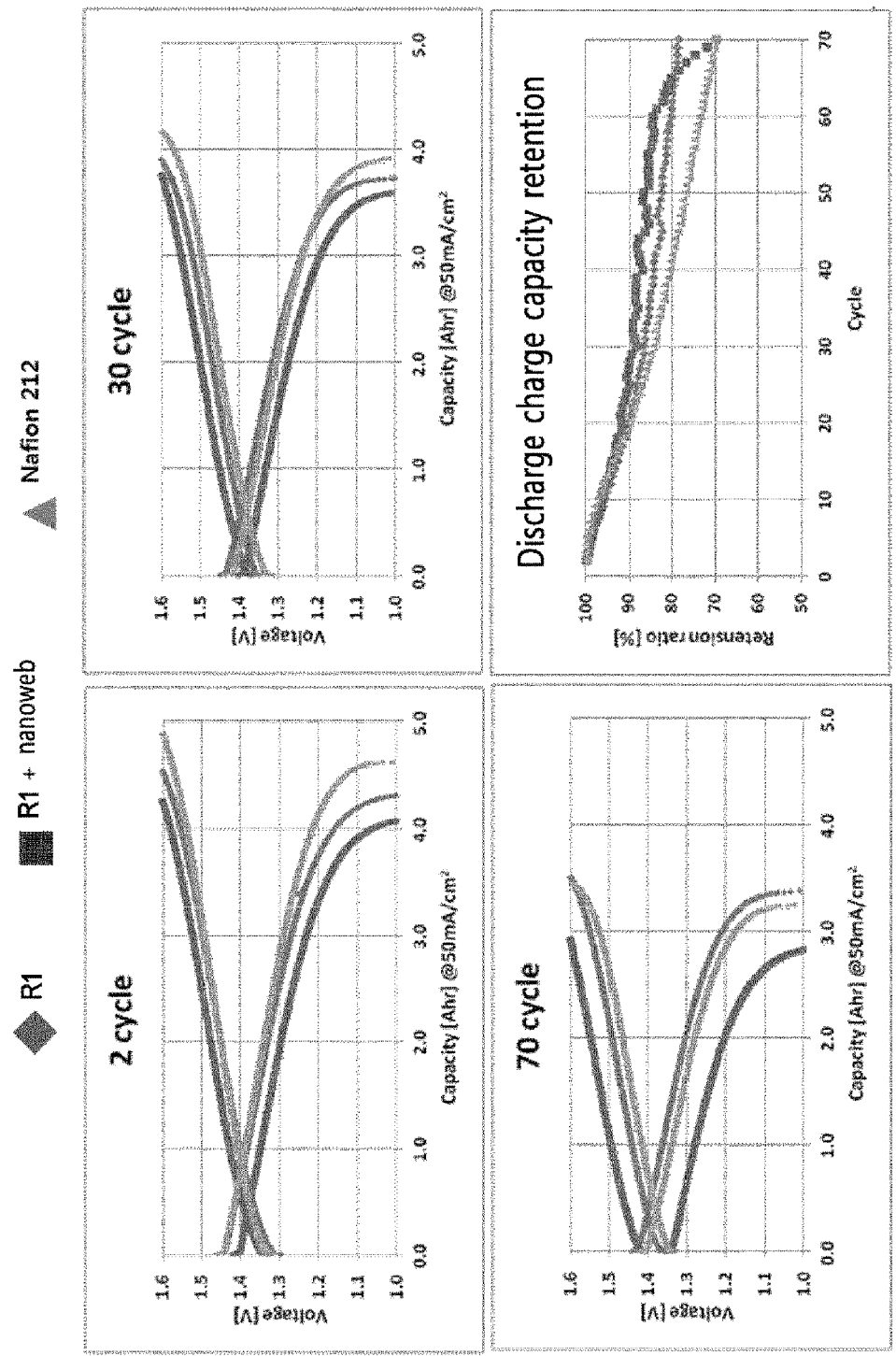
FIG. 12 shows graphs illustrating the performances and efficiency of a single cell including the R1 polymer ion exchange membrane and a reinforced composite membrane (R1+nano-web) containing R1, according to an embodiment of the present invention, as a separation membrane. The performances and discharge charge capacity retention rate were measured by repeated charging/discharging, and the results were compared with the performances of cell consisting of Nafion 212.

The performances of the single cell consisting of the reinforced composite membrane (R1+nano-web) containing ion exchange membrane (R1) prepared with R1 polymer and R1, and the single cell consisting of Nafion as an ion exchange membrane were compared by measuring the charging/discharging test and the efficiency under the same condition, using the same method. The comparative results are shown in FIG. 12. The performances of each single cell were compared, and the results are summarized in Table 3 below.

TABLE 3

| Separation Membrane | | R1 | R1 + Nanoweb | Nafion 212 |
|---|---|---|---|---|
| Result of charging/ discharging | Discharge current capacity (Ahr) @ 2 cycles | 4.3 | 4.06 | 4.62 |
| | Discharge current capacity (Ahr) @ 50 cycles | 3.55 | 3.52 | 3.56 |
| | Discharge current capacity retention (%) @ 50 cycles | 82 | 87 | 77 |
| | Energy efficiency (EE, %) @ 50 cycles | 85 | 82 | 84 |
| | Coulombic efficiency (CE, %) @ 50 cycles | 96 | 96 | 94 |

TABLE 3-continued

| Separation Membrane | R1 | R1 + Nanoweb | Nafion 212 |
|---|---|---|---|
| Voltage efficiency (VE, %) @ 50 cycles | 89 | 85 | 89 |

Operation test for the single cell performance evaluation was performed at room temperature i.e., 25° C., and the electrolyte flow rate was fixed at 40 ml/min. The charging was conducted until the current density of 50 mA/cm² reached 1.6 V, whereas the discharging was conducted until the current density reached 1.0 V using the same current density. The charging/discharging were repeated 100 times in order to test the durability of all single cells.

As shown in FIGS. 8 to 11, the single cell consisting of the ion exchange membrane shows a improved cell performance even when repeatedly charged/discharged several times. In addition, it not only maintains high levels of energy efficiency (EE), coulombic efficiency (CE) and voltage efficiency (VE), but also shows high discharge charge capacity retention rate. As a result, over 80% of retention rate was achieved when used after repeatedly charged/discharged more than 70 times.

Figure 13:
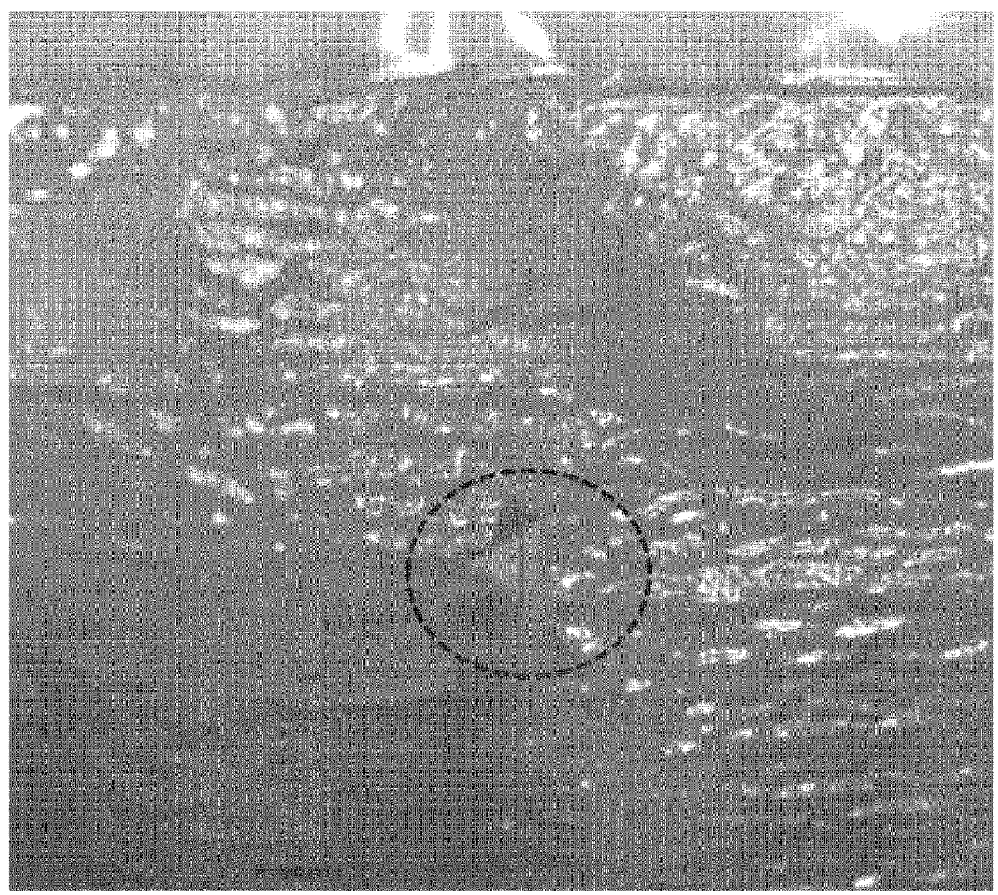
FIG. 13 shows an image of an isolated reinforced composition membrane, separated after repeated charging/discharging of the single cell including a reinforced composite membrane) containing R1 for more than 85 times including the reinforced composition membrane as a separation membrane.

The cell performance and the discharge charge capacity retention rate of the single cell consisting of the reinforced composite membrane containing R1, and the single cell consisting of Nafion 212 ion exchange membrane were compared. As represented in FIG. 12, the single cell consisting of R1 ion exchange membrane or R1 reinforced composite membrane shows similar or higher values, and relatively higher discharge charge capacity retention rate, compared to the single cells consisting of the conventional Nafion 212 ion exchange membrane, which is commercially available. It seems that the performances of all cells tend to decrease especially when repeatedly charged/discharged, but the performance reduction rate of the single cell consisting of R1 or R1 reinforced composite membrane was slower than that of the single cell consisting of Nafion. As a result, in the cell, wherein charging/discharging was repeated 70 times, the cell consisting of R1 or R1 reinforced composite membrane shows a higher performance than that of the cell consisting of R1 ion exchange membrane. That is, the cell consisting of the ion exchange membrane is an excellent ion conductor because its performance shows nearly equal initial discharge charge capacity retention rate, and greater mid-/long term discharge charge capacity retention rate compared to the performance of the single cell consisting of Nafion. However, in the cell, wherein charging/discharging was repeated 70 times, a rapid decrease in the cell performance can be seen in the cell consisting of R1 reinforced composite membrane. This rapid decrease was observed at the point where the discharge charge capacity retention rate exceeded 60 times, and this phenomenon was due to over-using the cells repeatedly, which in turn, caused the membrane to be damaged. As an embodiment, FIG. 13 displays an image of isolated R1 reinforced composite membrane from the cell, wherein charging/discharging was repeated more than 85 times. From this, it was confirmed that some parts of the reinforced composite membrane were damaged, and such damages may rapidly reduce the cell performances and the discharge charge capacity retention rate.

EXPLANATION OF SYMBOLS

101: Releasing Film
102: Catalyst layer
103: Ion conducting polymer membrane (electrolyte membrane)
211: Separation membrane (ion exchange membrane)
221: Positive
222: Negative
231: Catholyte inlet
232: Catholyte outlet
241: Anolyte inlet
242: Anolyte outlet
251: Cell housing

The invention claimed is:

1. An ion conducting polymer comprising a partially branched block copolymer, wherein the partially branched block copolymer comprises a first block comprising a hydrophilic first polymer; a second block derived from a hydrophobic second polymer having two or more reactive groups participating in a polymerization reaction at each of its both ends to provide branching points for forming side branches on a main chain; and optionally a third block comprising a hydrophobic third polymer, which is characterized by the first block represented by Formula 1 below, the hydrophobic second polymer represented by Formula 2 below, and the third block represented by Formula 3 below:

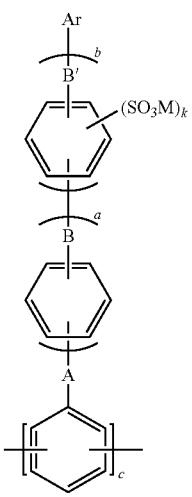

[Formula 1]

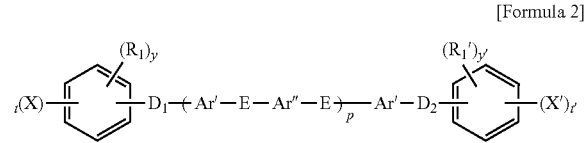

[Formula 2]

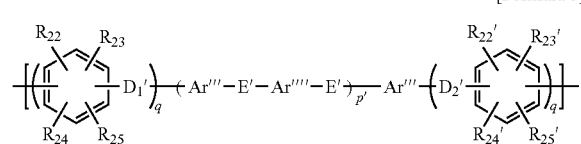

[Formula 3]

wherein, in Formula 1,

A is a single bond or —(C=O)—, —(P=O)—, —(SO$_2$)—, —CF$_2$—, or —(C(CF$_3$)$_2$)— as an electron withdrawing group;

B and B' are each independently a single bond or —O—, —S—, —NH—, or —NR$_{26}$— as an electron donating group, wherein R$_{26}$ is C$_{1-6}$ alkyl;

M is H or an alkali metal;

Ar is an aromatic molecule or a group of aromatic molecules substituted with at least one sulfonic acid group (—SO$_3$H) or an alkali metal salt thereof;

a and b are each an integer ranging from 0 to 10, k is an integer ranging from 1 to 4; and c is an integer ranging from 1 to 10,000, in Formula 2, D1 is a single bond, —O—, —S—, —NH—, or —NR$_{27}$— (wherein R$_{27}$ is C$_{1-6}$ alkyl) as an electron donating group, or

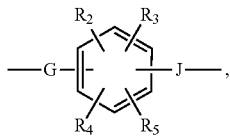

and D$_2$ is a single bond, —O—, —S—, —NH—, or —NR$_{27}$'— (wherein R$_{27}$' is C$_{1-6}$ alkyl) as an electron donating group, or

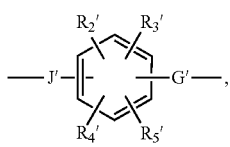

wherein G and G' are each independently a single bond or —(C═O)—, —(P═O)—, —(SO$_2$)—, —CF$_2$—, or —(C(CF$_3$)$_2$)— as an electron withdrawing group, and J and J' are each independently —O—, —S—, —NH—, or —NR$_{28}$— as an electron donating group, wherein R$_{28}$ is C$_{1-6}$ alkyl;

E is —O—, —S—, —NH—, or —NR$_{29}$— as an electron donating group, wherein R$_{29}$ is C$_{1-6}$ alkyl;

Ar' is unsubstituted or substituted with at least one substituent selected from the group consisting of a halogen atom (—X), C$_{1-6}$ alkyl, C$_{1-6}$ halogen-substituted alkyl, C$_{1-6}$ allyl, cyano, aryl, a sulfonic acid group, a phosphoric acid group (—PO$_3$H$_2$), an acetic acid group (—CO$_2$H), nitro (—NO$_2$), perfluoroalkyl, perfluoroalkylaryl, perfluoroaryl and —O-perfluoroaryl, aryl, naphthyl, anthracenyl,

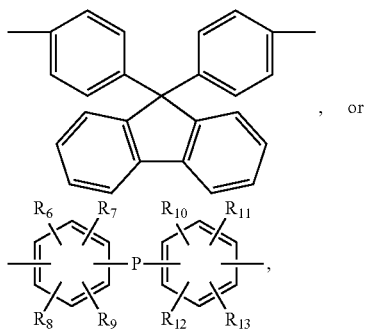

wherein the C$_{1-6}$ alkyl, C$_{1-6}$ perfluoroalkyl and C$_{1-6}$ perfluoroalkylaryl optionally comprise at least one oxygen, nitrogen or sulfur atom in its chain, and P is a single bond, —O—, —S—, —NH—, or —NR$_{30}$— (wherein R$_{30}$ is C$_{1-6}$ alkyl) as an electron donating group, or —(C═O)—, —(P═O)—, —(SO$_2$)—, —CF$_2$—, —(C(CH$_3$)$_2$)—, or —(C(CF$_3$)$_2$)— as an electron withdrawing group;

Ar'' is unsubstituted or substituted with at least one substituent selected from the group consisting of a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl and —O-perfluoroaryl, aryl, naphthyl, anthracenyl,

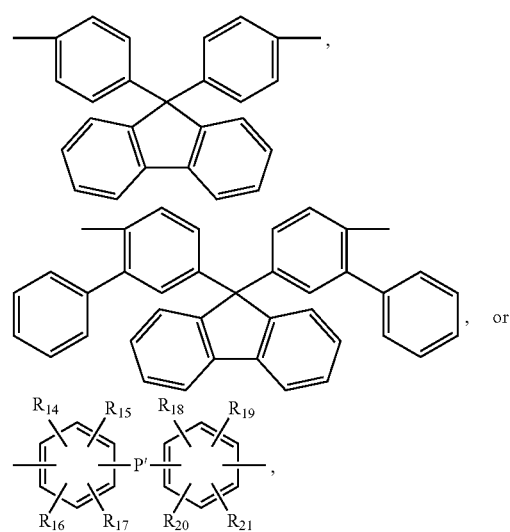

wherein the alkyl, perfluoroalkyl, and perfluoroalkylaryl optionally comprise at least one oxygen, nitrogen, or sulfur atom in its chain, and P' is a single bond, —O—, —S—, —NH—, or —NR$_{31}$— (wherein R$_{31}$ is C$_{1-6}$ alkyl) as an electron donating group, or —(C═O)—, —(P═O)—, —(SO$_2$)—, —CF$_2$—, —(C(CH$_3$)$_2$)—, or —(C(CF$_3$)$_2$)— as an electron withdrawing group;

R$_1$ and R$_1$' are each independently a hydrogen atom, a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl, or —O-perfluoroaryl, wherein the alkyl, perfluoroalkyl and perfluoroalkylaryl optionally comprise at least one oxygen, nitrogen, or sulfur atom in their chain;

X and X' are each independently a halogen atom and are the reactive groups participating in the polymerization reaction to form a branching point for forming branches on the main chain;

R$_2$ to R$_{21}$ and R$_2$' to R$_5$' are each independently a hydrogen atom, a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain; wherein, in Formula 1 or Formula 2, the sulfonic acid group, the phosphoric acid group, and the acetic acid group may be in the form of an alkali metal salt;

p is an integer ranging from 1 to 1000, t and t' are each independently an integer ranging from 2 to 5, and y and y' are each independently an integer ranging from 0 to 3, while the combinations of numbers are represented by t+y=5 and t'+y'=5; and in Formula 3, $D_1'$ and $D_2'$ may be each introduced with a functional group in the same range as that of $D_1$ and $D_2$ of Formula 2, wherein each of $D_1$ and $D_1'$, and $D_2$ and $D_2'$ may be same with or different from each other;

Ar''' may be introduced with a functional group having the same range as that of Ar' of Formula 2, wherein Ar'' and Ar'''' may be identical to or different from each other;

Ar'''' may be introduced with a functional group in the same range as that of Ar'' of Formula 2, wherein Ar'' and Ar'''' may be identical to or different from each other;

E' is as an electron donating group and may be introduced with a functional group in the same range as that of E of Formula 2, wherein E and E' may be identical to or different from each other; and $R_{22}$ to $R_{25}$ and $R_{22}'$ to $R_{25}'$ are each independently a hydrogen atom, a halogen atom, $C_{1-6}$ alkyl, $C_{1-6}$ halogen-substituted alkyl, $C_{1-6}$ allyl, cyano, aryl, a sulfonic acid group, a phosphoric acid group, an acetic acid group, nitro, $C_{1-6}$ perfluoroalkyl, $C_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain;

the sulfonic acid group, the phosphoric acid group, and the acetic acid group in Formula 3 may be in the form of an alkali metal salt; and q and q' are each independently an integer ranging from 0 to 5, and p' is an integer ranging from 1 to 1000.

2. The ion conducting polymer of claim 1, wherein the first block to the third block are arranged randomly, alternately, or sequentially.

3. The ion conducting polymer of claim 1, wherein the first polymer, the second polymer, and the third polymer are each independently are homopolymers.

4. The ion conducting polymer of claim 1, wherein the first block consisting of the hydrophilic first polymer has a skeleton formed by carbon-carbon bonds.

5. The ion conducting polymer of claim 1, wherein the second block derived from the hydrophobic second polymer or the third block consisting of the hydrophobic third polymer has an ether bond (—O—) within the skeleton.

6. The ion conducting polymer of claim 1, wherein the partially branched block copolymer comprises a skeleton comprising a repeating unit represented by Formula 4 below:

[Formula 4]

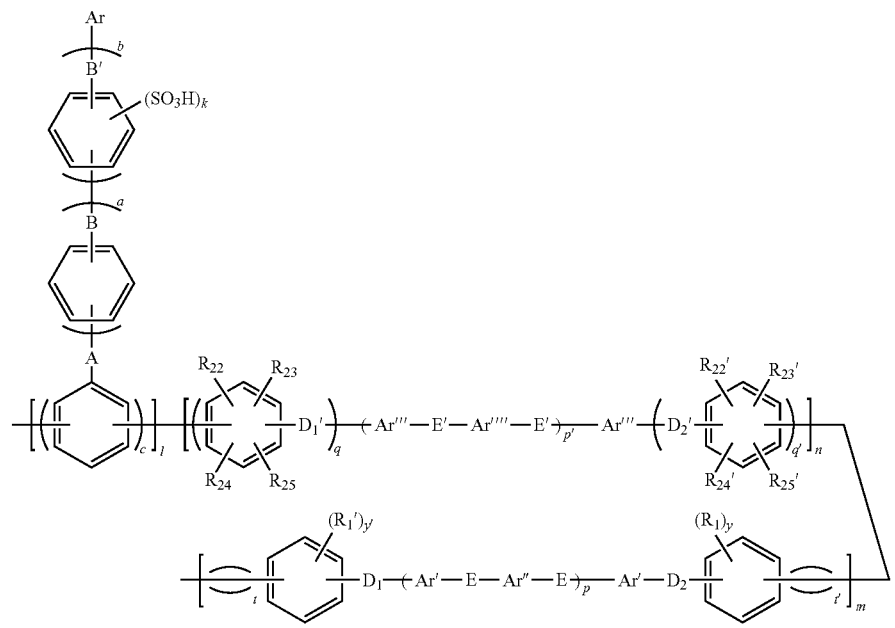

wherein, in Formula 4, each abbreviation is the same as described in claim 1;

l and m are independently an integer of 1 or higher, and n is an integer of 0 or higher.

7. The ion conducting polymer of claim 1, wherein the p and p' are each independently an integer ranging from 1 to 50.

8. The ion conducting polymer of claim 6, wherein the ratio of l:m+n in the partially branched block copolymer ranginess from 0.1:1 to 100:1.

9. The ion conducting polymer of claim 8, wherein $0.5 \le n/(m+n) < 1$.

10. The ion conducting polymer of claim 1, wherein the ion conducting polymer is characterized by a linearly branched shape, an inter-crosslinked net-like shape, or a combination thereof.

11. A compound comprising a repeating unit represented by Formula 4 below:

[Formula 4]

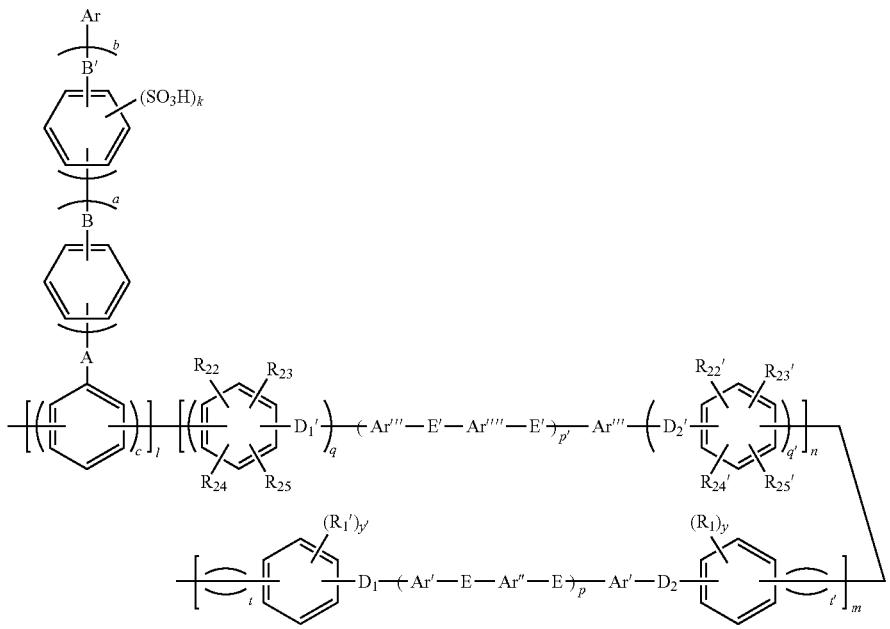

wherein

A is a single bond, or —(C=O)—, —(P=O)—, —(SO₂)—, —CF₂—, or —(C(CF₃)₂)— as an electron withdrawing group;

B and B' are each independently a single bond, or —O—, —S—, —NH—, or —NR$_{26}$— as an electron donating group, wherein R$_{26}$ is $C_{1-6}$ alkyl;

M is H or an alkali metal;

Ar is an aromatic molecule or a group of aromatic molecules substituted with at least one sulfonic acid group (—SO₃H) or an alkali metal salt thereof;

a and b are each an integer ranging from 0 to 10, k is an integer ranging from 1 to 4; and c is an integer ranging from 1 to 10,000, D1 is a single bond, —O—, —S—, —NH— or —NR$_{27}$— (wherein R$_{27}$ is $C_{1-6}$ alkyl) as an electron donating group, or

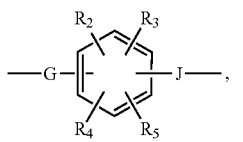

and D₂ is a single bond, —O—, —S—, —NH—, or —NR$_{27}$'— (wherein R$_{27}$' is $C_{1-6}$ alkyl) as an electron donating group, or

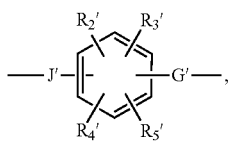

wherein G and G' are independently a single bond or —(C=O)—, —(P=O)—, —(SO₂)—, —CF₂—, or —(C(CF₃)₂)— as an electron withdrawing group, and J and J' are each independently —O—, —S—, —NH—, or —NR$_{28}$— as an electron donating group, wherein R$_{28}$ is $C_{1-6}$ alkyl;

E is —O—, —S—, —NH—, or —NR$_{29}$— as an electron donating group, wherein R$_{29}$ is $C_{1-6}$ alkyl;

Ar' is unsubstituted or substituted with at least one substituent selected from the group consisting of a halogen atom, $C_{1-6}$ alkyl, $C_{1-6}$ halogen-substituted alkyl, $C_{1-6}$ allyl, cyano, aryl, a sulfonic acid group, a phosphoric acid group, an acetic acid group, nitro, $C_{1-6}$ perfluoroalkyl, $C_{1-6}$ perfluoroalkylaryl, perfluoroaryl, and —O-perfluoroaryl, aryl, naphthyl, anthracenyl,

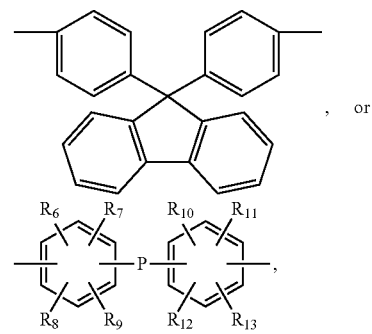

wherein the alkyl, perfluoroalkyl, and perfluoroalkylaryl optionally comprise at least one oxygen, nitrogen, or sulfur atom in its chain, and P is a single bond, —O—, —S—, —NH—, or —NR$_{30}$— (wherein R$_{30}$ is $C_{1-6}$ alkyl) as an electron donating group, or —(C=O)—, —(P=O)—, —(SO₂)—, —CF₂—, —(C(CH₃)₂)—, or —(C(CF₃)₂)— as an electron withdrawing group;

Ar" is unsubstituted or substituted with at least one selected from the group consisting of halogen atom, alkyl, halogen-substituted alkyl, allyl, cyano, aryl, sulfonic acid group, phosphoric acid group, acetic acid group, nitro, perfluoroalkyl, perfluoroalkylaryl, perfluoroaryl and —O-perfluoroaryl, aryl, naphthyl, anthracenyl,

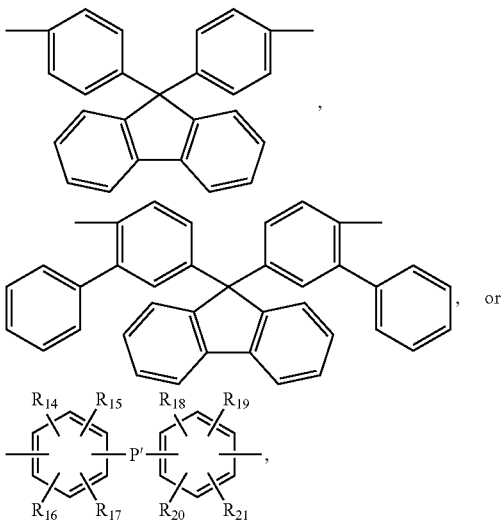

, or wherein the alkyl, perfluoroalkyl and perfluoroalkylaryl optionally comprise at least one oxygen, nitrogen, or sulfur atom in its chain, and P' is a single bond, —O—, —S—, —NH—, or —NR$_{31}$— (wherein R$_{31}$ is C$_{1-6}$ alkyl) as an electron donating group, or —(C=O)—, —(P=O)—, —(SO$_2$)—, —CF$_2$—, —(C(CH$_3$)$_2$)—, or —(C(CF$_3$)$_2$)— as an electron withdrawing group;

R$_1$ and R$_1$' are each independently a hydrogen atom, a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain;

R$_2$ to R$_{21}$ and R$_2$' to R$_5$' are each independently a hydrogen atom, a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain; wherein, the sulfonic acid group, the phosphoric acid group, and the acetic acid group may be in the form of an alkali metal salt;

p is an integer ranging from 1 to 1000, t and t' are each independently an integer ranging from 2 to 5, and y and y' are each independently an integer ranging from 0 to 3, while the combinations of numbers are t+y=5 and t'+y'=5;

D$_1$' and D$_2$' may be each introduced with a functional group in the same range as that of D$_1$ and D$_2$, wherein each of D$_1$ and D$_1$', and D$_2$ and D$_2$' may be identical to or different from each other;

Ar''' may be introduced with a functional group in the same range as that of Ar' above, wherein Ar' and Ar''' may be identical to or different from each other;

Ar'''' may be introduced with a functional group in the same range as that of A'' above, wherein Ar'' and Ar'''' may be identical to or different from each other;

E' is as an electron donating group and may be introduced with a functional group in the same range as that of E above, wherein E and E' may be same with or different from each other; and R$_{22}$ to R$_{25}$ and R$_{22}$' to R$_{25}$' are each independently a hydrogen atom, a halogen atom, C$_{1-6}$ alkyl, C$_{1-6}$ halogen-substituted alkyl, C$_{1-6}$ allyl, cyano, aryl, a sulfonic acid group, a phosphoric acid group, an acetic acid group, nitro, C$_{1-6}$ perfluoroalkyl, C$_{1-6}$ perfluoroalkylaryl, perfluoroaryl, or —O-perfluoroaryl, wherein the alkyl, perfluoroalkyl, and perfluoroalkylaryl optionally comprise at least one oxygen, nitrogen, or sulfur atom in their chain;

the sulfonic acid group, the phosphoric acid group, and the acetic acid group in Formula 4 may be in the form of an alkali metal salt; and q and q' are each independently an integer ranging from 0 to 5, and p' is an integer ranging from 1 to 1000, and l and m are each independently an integer of 1 or higher, and n is an integer of 0 or higher.

12. A method for preparing the ion conducting polymer of claim 1, comprising
preparing a hydrophilic monomer which forms the hydrophilic first polymer;
preparing a hydrophobic second polymer;
optionally preparing a hydrophobic third polymer; and
forming a partially branched block copolymer via Colon coupling reaction by mixing the hydrophilic monomer, the hydrophobic second polymer, and optionally the hydrophobic third polymer.

13. The method of claim 12, wherein the sulfonic acid group of the hydrophilic monomer is in the form of a proton or an alkali metal salt.

14. An ion conductor comprising a polymer of claim 1.

15. An electrolyte membrane prepared from an ion conducting polymer comprising the branched block copolymer of claim 1.

16. A membrane-electrode assembly (MEA) comprising the electrolytic membrane of claim 15.

17. A battery comprising the membrane-electrode assembly (MEA) of claim 16.

18. A separation membrane for a redox flow battery prepared from an ion conducting polymer comprising the partially branched block copolymer of claim 1.

19. The separation membrane of claim 18, wherein the separation membrane is a polymer membrane prepared by shaping the ion conducting polymer itself or a composite membrane prepared by impregnating the ion conducting polymer into a nano-web support.

20. A redox flow battery comprising, an anode, an anolyte, a separation membrane of claim 18, a catholyte, and a cathode.

* * * * *